US005952806A

United States Patent [19]

Muramatsu

[11] Patent Number: 5,952,806

[45] Date of Patent: Sep. 14, 1999

[54] INNER FORCE SENSE CONTROLLER FOR PROVIDING VARIABLE FORCE TO MULTIDIRECTIONAL MOVING OBJECT, METHOD OF CONTROLLING INNER FORCE SENSE AND INFORMATION STORAGE MEDIUM USED THEREIN

[75] Inventor: Shigeru Muramatsu, Shizuoka, Japan

[73] Assignee: Yamaha Corporation, Japan

[21] Appl. No.: 08/953,004

[22] Filed: Oct. 16, 1997

[30] Foreign Application Priority Data

| | | | |
|---|---|---|---|
| Oct. 18, 1996 | [JP] | Japan | 8-276638 |
| Jun. 6, 1997 | [JP] | Japan | 9-149749 |

[51] Int. Cl.[6] .......... G05B 19/24; G10F 1/02; G06F 15/00

[52] U.S. Cl. .......... 318/568.12; 318/568.1; 318/568.11; 318/632; 318/640

[58] Field of Search .......... 318/571, 603, 318/602, 601, 687, 135, 114, 128, 560–696; 388/847, 903

[56] References Cited

U.S. PATENT DOCUMENTS

| | | | |
|---|---|---|---|
| 4,425,073 | 1/1984 | Mattsson | 414/730 |
| 4,656,400 | 4/1987 | Pailthorp et al. | 318/135 |
| 5,294,757 | 3/1994 | Skalski et al. | 187/393 |
| 5,389,865 | 2/1995 | Jocobus et al. | 318/567.11 |
| 5,459,382 | 10/1995 | Jacobus et al. | 318/568.11 |
| 5,629,594 | 5/1997 | Jacobus et al. | 318/568.11 |
| 5,767,839 | 6/1998 | Rosenberg | 345/161 |
| 5,784,542 | 7/1998 | Ohm et al. | 395/95 |
| 5,796,927 | 8/1998 | Hegg | 395/95 |
| 5,831,408 | 11/1998 | Jacobus et al. | 318/568.11 |

*Primary Examiner*—Paul Ip

*Attorney, Agent, or Firm*—Ostrolenk, Faber, Gerb & Soffen, LLP

[57] ABSTRACT

An inner force sense controller includes an actuator for exerting a reaction force on a moving object such as a manipulator, a sensor for producing a detecting signal indicative of current position of the moving object and a controlling unit connected to the actuator and the sensor; the controlling unit calculates a current velocity so as to determine the direction of motion, and selects one of the data tables assigned to the direction of the motion for reading out a target reaction force; and the operator feels the inner force sense to be different depending upon the direction of the motion.

21 Claims, 20 Drawing Sheets

INNER FORCE SENSE CONTROLLER FOR PROVIDING VARIABLE FORCE TO MULTIDIRECTIONAL MOVING OBJECT, METHOD OF CONTROLLING INNER FORCE SENSE AND INFORMATION STORAGE MEDIUM USED THEREIN

FIELD OF THE INVENTION

This invention relates to a controller for an inner force sense and, more particularly, to an inner force sense controller for providing variable resistance or variable power assist to a multidirectional moving object.

DESCRIPTION OF THE RELATED ART

An acoustic piano generates piano tones in response to fingering on the keyboard through a complicated action. A key is linked with a key action mechanism, and the key action mechanism drives a hammer for rotation. A set of strings is opposed to the hammer, and a damper is associated with the set of strings for attenuating the vibrations. When a pianist depresses the key from the rest position toward the end position, the key causes the key action mechanism to turn, and spaces the damper from the set of strings. The jack of the key action mechanism forcibly rotates the hammer until a certain point. When the key action mechanism reaches the certain point, the jack kicks the hammer, and the hammer escapes from the jack. Then, the hammer starts a free rotation toward the set of strings, and strikes the strings. The strings vibrate for generating the piano sound, and the hammer rebounds on the strings. A back check of the key action mechanism receives the hammer. When the pianist releases the key, the key turns toward the rest position, and damper is brought into contact with the set of strings, again. The hammer is spaced from the back check, and the jack is engaged with the hammer, again. Thus, the behavior of the acoustic piano is so complicated that the reaction to the key motion is not constant.

On the other hand, an electronic keyboard generates an electronic sound through a tone generator. A key switching circuit identifies a depressed key, and gives a timing for generating an electronic sound and a timing for extinguishing the electronic sound. For this reason, the key is only resiliently urged to the rest position, and a player feels the key touch much simpler than the piano key touch.

The electronic keyboard musical instrument may be equipped with an automatic playing systems. The automatic playing system includes solenoid-operated actuators provided under the keys. A controlling unit selectively en-ergizes the solenoid-operated actuators, and the plungers push the keys as if a player selectively depresses the keys. While a pianist is playing a tune on the electronic keyboard musical instrument, the solenoid-operated actuators push the keys against the depressed key, and gives resistance against the finger of the pianist. Thus, the solenoid-operated actuators serve as parts of a key touch controller.

A virtual technology produces a virtual environment by using a computer system, and makes a person experience a virtual reality therein. When a person fingers a solid object, the person feels a reaction to the finger. The virtual technology calls the reaction as "inner force sense", and tries to artificially produce the inner force sense. The resistance against the finger is a kind of the inner force sense. The solenoid-operated actuators only unidirectionally generate the resistance, and, for this reason, the prior art key touch controller is a kind of the unidirectional inner-force-sense controller. In fact, the prior art key touch controller generates the resistance against only the depressed key.

SUMMARY OF THE INVENTION

It is therefore an important object of the present invention to provide an inner force sense controller, which provides variable resistance to a multidirectional moving object.

In accordance with one aspect of the present invention, there is provided an inner force sense controller for giving a force to a manipulator depending upon a current position of the manipulator comprising an actuator connected to the manipulator and driving the manipulator in more than one direction, a detector for detecting the current position of the manipulator, a controller connected to the actuator and the detector, and producing a controlling signal representative of the force to be produced by the actuator, and a driver responsive to the controlling signal for energizing the actuator, thereby exerting the force to the manipulator.

In accordance with another aspect of the present invention, there is provided a method for controlling an inner force sense comprising the steps of producing a piece of status information representative of a current status of a manipulator movable in more than one direction, determining the magnitude of a force on the basis of the current status, and exerting the force on the manipulator for imparting the inner force sense.

In accordance with yet another aspect of the present invention, there is provided an information storage medium for storing a controlling program, and the controlling program comprises the steps of producing a piece of status information representative of a current status of a manipulator movable in more than one direction, determining the magnitude of a force on the basis of the current status, and exerting the force on the manipulator for imparting the inner force sense.

In accordance with still another aspect of the present invention, there is provided an inner force sense controller for exerting a force on a manipulator movable in more than one direction by using an actuator comprising a means for receiving a program through an information communicating network, and the program includes the steps of producing a piece of status information representative of a current status of a manipulator movable in more than one direction, determining the magnitude of a force on the basis of the current status, and exerting the force on the manipulator for imparting the inner force sense.

BRIEF DESCRIPTION OF THE DRAWINGS

The features and advantages of the inner force sense controller will be more clearly understood from the following description taken in conjunction with the accompanying drawings in which.

DESCRIPTION OF THE PREFERRED EMBODIMENTS

First Embodiment

Figure 1:
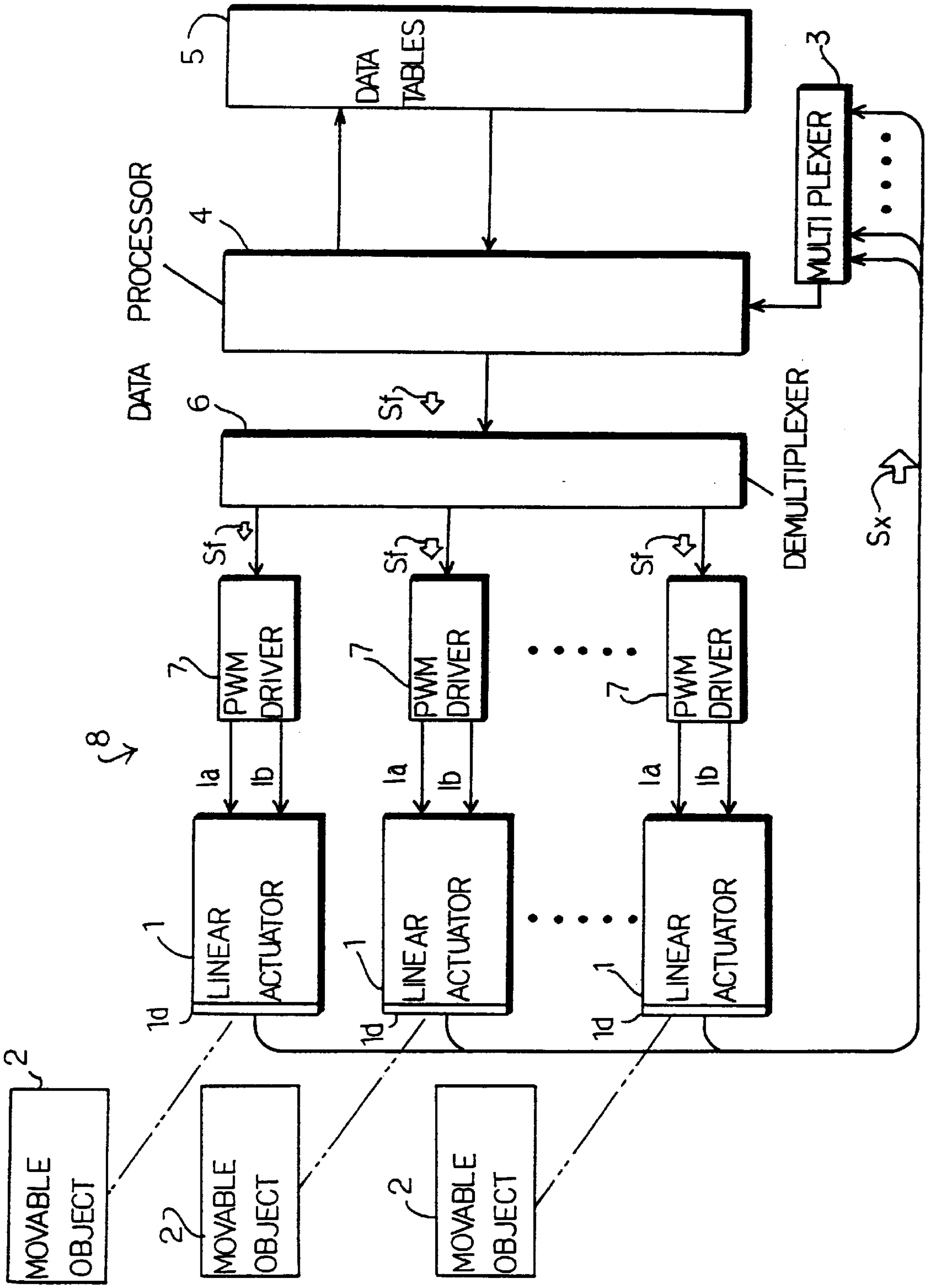
FIG. 1 is a block diagram showing the arrangement of an inner force sense controller according to the present invention.

Referring to FIG. 1 of the drawings, the inner force sense controller embodying the present invention comprises a plurality of linear actuators 1 respectively associated with movable objects 2. The lineal actuator 1 comprises coils 1*a*/1*b* and a plunger 1c of iron slidably inserted into the coils 1*a*/1*b*. The leading end of the plunger 1*c* is engaged with the movable object 2 A sensor 1*d* monitors the plunger, and determines the current plunger position X with respect to a home position where the plunger is maintained without supply of electric current to the coils 1*a*/1*b*. The sense Id produces a positional signal Sx representative of the current plunger position X.

Figure 3:
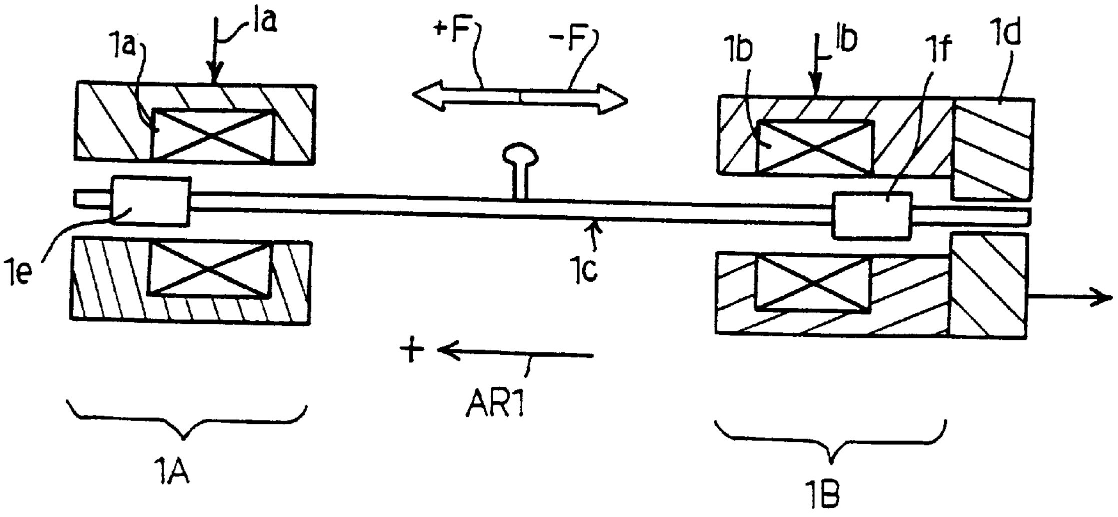
FIG. 3 is a cross sectional view showing the structure of another linear actuator.

When electric current I*a* energizes the coil 1*a*, the coil 1*a* creates magnetic field, and the electromagnetic force attracts the plunger 1*c* toward the coil 1*a*. Then, the plunger 1*c* is moved in the direction indicated by arrow AR1, and the plunger 1*c* exerts force +F on the moving object 2. On the other hand, when electric current 1*b* energizes the other coil 1*b*, the plunger 1*c* is moved in the opposite direction, and negative force −F is exerted on the moving object 2. Thus, the solenoid-operated actuator 1 is bi-directionally The coils 1*a* and 1*b* may be spaced from each other as shown in FIG. 3. The coil 1*a* is spaced from the other coil 1*b*, and the solenoid-operated actuator is separated into two portions 1A and 1B. The two portions 1A/1B selectively exert the electromagnetic force on the end portions 1*e*/1*f* of the plunger 1*c*. The plunger 1*c* is elongated, and is connected at the intermediate point thereof. When the electric current 1*a* energizes the coil 1*a*, the electromagnetic force is exerted on the end portion 1*e*, and the plunger is moved in the direction of allow AR1 so as to exert the positive force +F on the moving object 2. On the other hand, when the electric current 1*b* energizes the coil 1*b*, the electromagnetic force is exerted on the other end portion 1*f*, and the plunger 1*c* is moved in the opposite direction to allow AR1 so as to exert the negative force −F on the moving object 2.

The inner force sense controller further comprises a multiplexer 3, a data processor 4 and data tables 5. The multiplexer 3 is connected to the sensors 1*d* of the linear actuators 1, and the positional signals Sx are supplied in parallel from the sensors 1*d* of the linear actuators 1 to the multiplexer 3. The multiplexer 3 assigns time slots to the positional signals Sx, and the positional signals Sx are Supplied in serial from the multiplexer 3 to the data processor 4. The data processor 4 calculates a current plunger velocity X' on the basis of the current plunger position X and the previous plunger position, and in turn calculates a current plunge: acceleration X" on the basis of the current plunger velocity X' and the previous plunger velocity. The data processor 4 further calculates a target force F for each of the linear actuator 1 by using an equation of motion such as $F=MX''+\rho X'+\kappa X$. M is the mass, ρ is a coefficient of viscosity and κ is a spring constant. MX", ρX' and κX forms a set of parameters representative of a target force F, and are stored in the data tables 5 for each of the linear actuators 1. The data tables 5 are implemented by a read only memory device.

The inner force sense controller further comprises a demultiplexer 6 and a plurality of pwm (Pulse Width Modulation) drivers 7 respectively associated with the linear drivers 1. The demultiplexer 6 is connected between the data processor 4 and the pwm drivers 7, and distributes data signals Sf each representative of the target re action force F to the pwm drivers 7. The pwm driver 7 regulates the electric current Ia/Ib to a target value equivalent to the target force F, and selectively supplies the electric current Ia/Ib to the coil 1a/1b of the associated linear actuator 1. The multiplexer 3, the data processor 4, the data tables 5, the demultiplexer 7 and the pwm drivers 7 as a whole constitute a controlling unit 8.

Figure 4A:
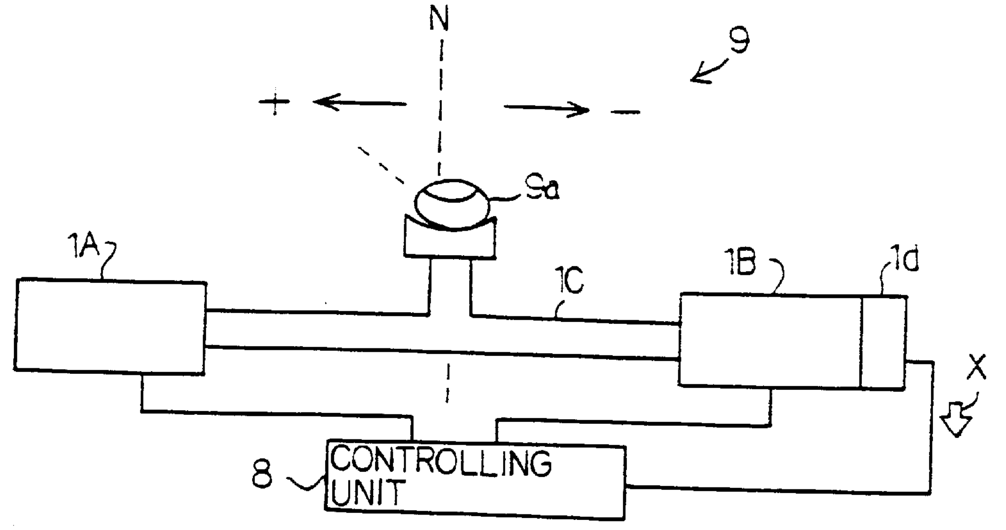
FIGS. 4A to 4C are schematic views showing a slide switch associated with the inner force sense controller and having a knob at different positions.
Figure 4B:
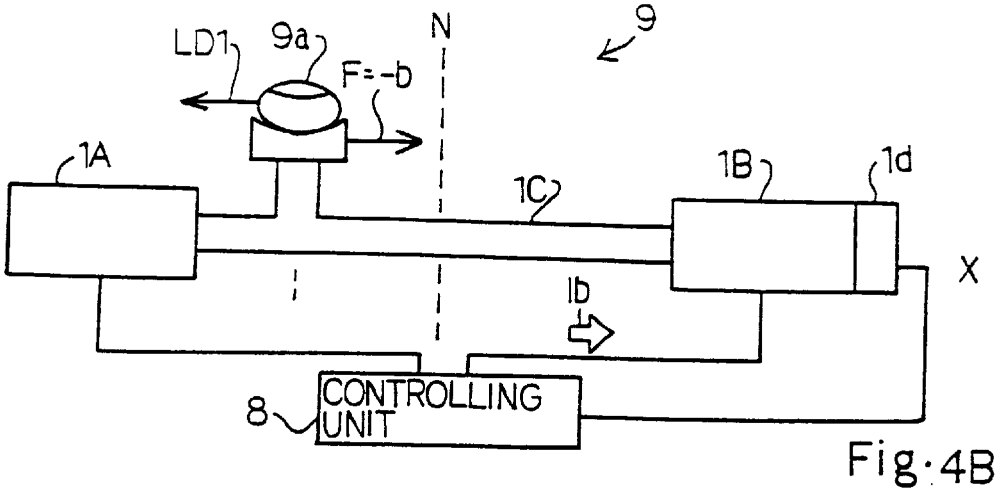
Figure 4C:
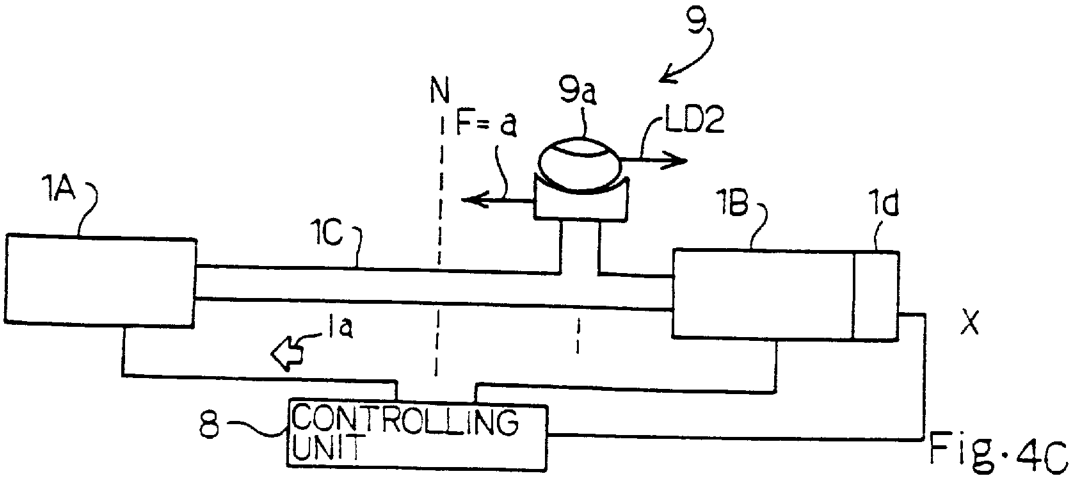

FIGS. 4A to 4C illustrate an application of the inner force sense controller. The inner force sense controller provides a resistance against bi-directional sliding motion of an array of slide switches 9 Each of the slide switches 9 has a knob 9a connected to the plunger 1c of the linear actuator 1 shown in FIG. 3, and the knob 9a is at the mid point between the two-portions 1A and 1B as shown in FIG. 4A. When the knob 9a is at the mid point, the slide switch stays at neutral position N, and the sensor 1d supplies a positional signal Sx representative of the neutral position N or distance "0" to the multiplexer 3 of the controlling unit 8.

Figure 5:
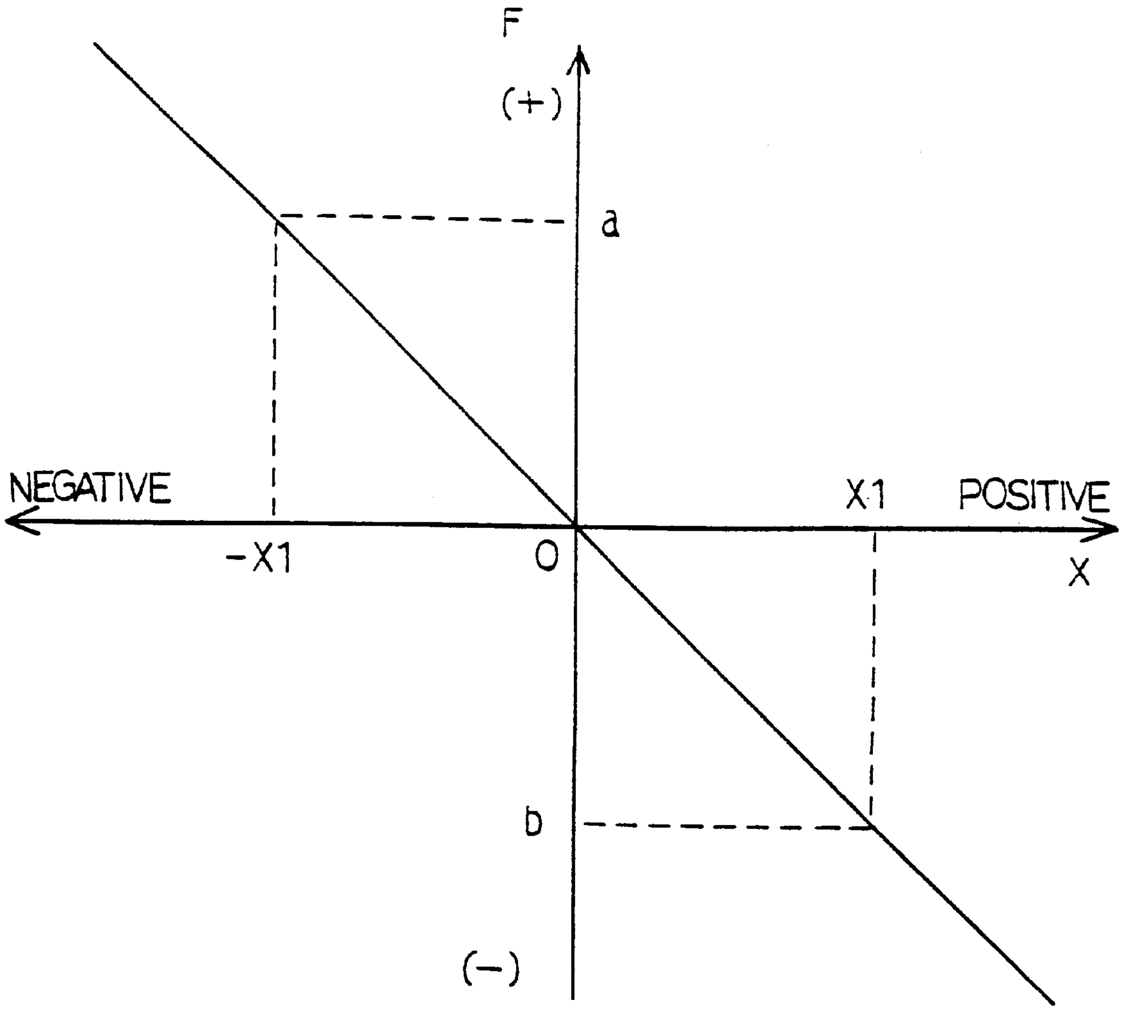
FIG. 5 is a graph showing the position of a knob and target force urging the know toward a neutral position.

In this instance, the MX" and ρX' are assumed to be zero, and the target reaction force F is dependent on κX only. For this reason, the target reaction force F is proportional to the value of the positional signal Sx or the distance from the neutral position N as shown in FIG. 5. The target reaction force F is stored in the data tables 5 in terms of the distance from the neutral position, and the data processor 4 supplies the current position X to the data tables 5. Then, the target reaction force F corresponding to the current position X is read out from the data tables 5, and the data processor 4 supplies the target reaction force F through the demultiplexer 6 to associated one of the pwm driver 7.

If an operator exerts force LD1 on the knob 9a so as to move it to position X1 as shown in FIG. 4B, the data processor 4 determines the target reaction force F=–b, and the associated pwm driver 7 supplies the electric current 1b to the coil 1b. The electromagnetic force F=–b rightwardly urges the plunger 1c, and the operator feels the target reaction force F=–b to be the inner force sense. When the operator releases the knob 9a, the knob 9a returns to the neutral position N, because the target reaction force F is still produced depending on the position X.

On the other hand, if an operator exerts force LD2 on the knob 9a so as to move it to position –X1 as shown in FIG. 4C, the data processor 4 determin-es the target reaction force F=a, and the associated pwm drivel 7 supplies the electric current Ia to the coil 1a so as to generate the electromagnetic force F=a. The electromagnetic force F=a leftwardly urges the plunger 1c, and the operator feels the target reaction force F=a to be the inner force sense. When the operator releases the knob 9a, the knob 9a returns to the neutral position N, because the target force F is still produced in dependent on the position X.

Thus, the inner force sense controller applies the reaction force F to the slide switch 9, and the magnitude of the reaction force F is increased together with the distance between the current knob position X and the neutral position N. The knob 9a is urged toward the neutral position N at all times.

Figure 2:
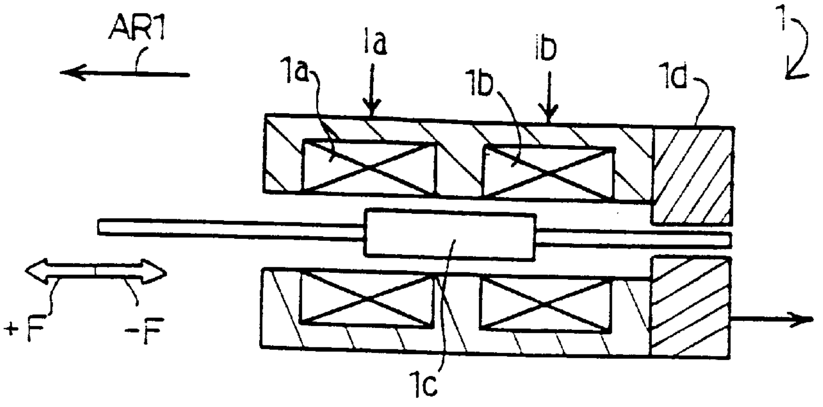
FIG. 2 is a cross sectional view showing the structure of a linear actuator incorporated in the inner force sense controller.
Figure 6:
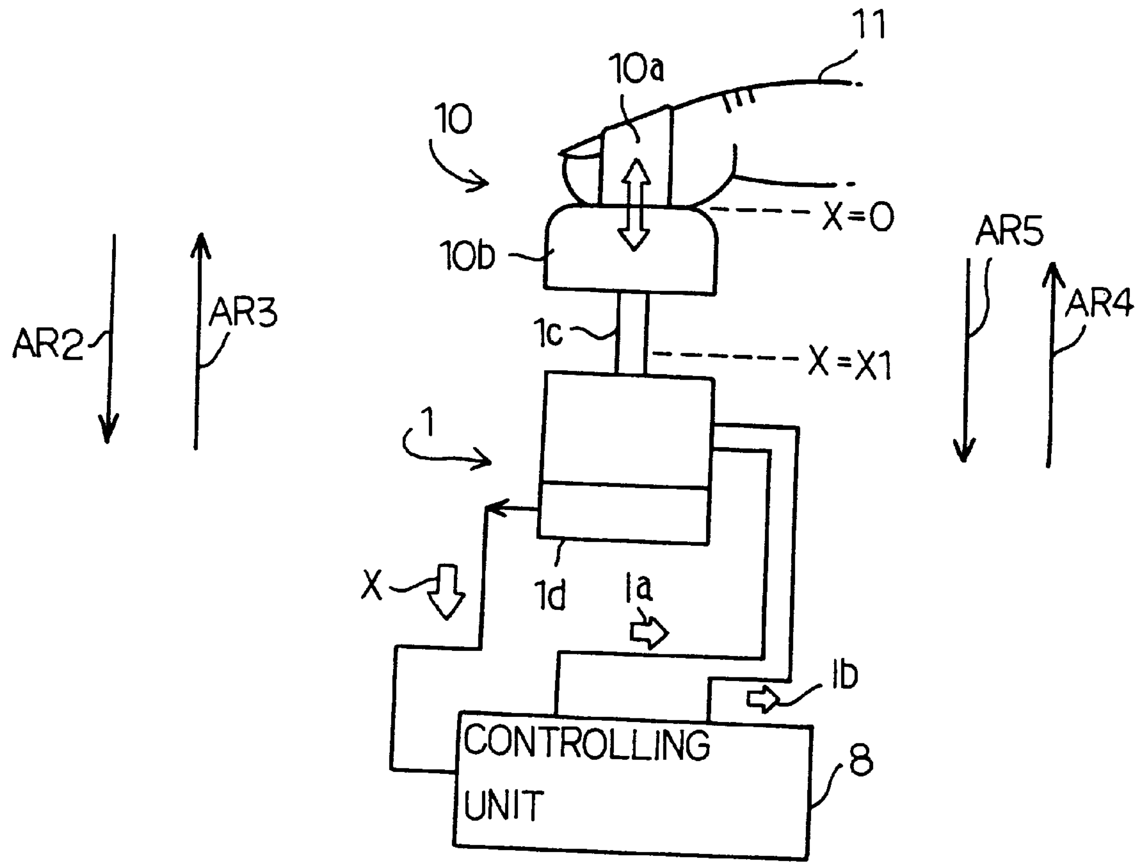
FIG. 6 is a side view showing a button key associated with the inner force sense controller according to the present invention.

FIG. 6 illustrates another application of the inner force sense controller according to the present invention. The inner force sense controller is provided for an array of button keys 10, and the button key 10 has a loop 10a fixed to a button 10b thereof. An operator inserts a finger 11 into the loop 10a, and manipulates the button key 10. The button 10b is connected to the plunger 1c of the linear actuator shown in FIG. 2. When no force is exerted on the button 10b, the button key 10 stays at the home position. The controlling unit 8 selectively supplies the electric current Ia/Ib to the coil 1a/1b, and provides the resistance against the motion of the key 10.

When the operator depresses the button 10b in the direction indicated by arrow AR2, the button 10b retracts the plunger 1c into the coils 1a/1b, and the sensor 1d detects a current position X, and reports the Current position X to the controlling unit 8. The multiplexer 3 transfers the current position X to the data processor 4 at an appropriate timing. In this instance, MX"and ρX' are assumed to be zero, and the target reaction force F is proportional to the current position X or the distance between the neutral position "0" and the current position X. However, when the button 10b reaches the position spaced from the neutral position by X1, the target reaction force F becomes constant –f1/+f1.

The data tables 5 stores two groups of reaction data. One of the groups is used for the motion indicated by arrow AR2, and the other group is used for the motion indicated by arrow AR3. Although the groups of reaction data are fixedly assignied to the downward motion and the upward motion, the reaction data groups may be arbitrary selected by the operator. In this instance, plots PL1 and PL2 represent the relation between the target reaction force F and the position X for the downward motion and for the upward motion (see FIGS. 7A and 7B).

The data processor 4 calculates a current velocity X' on the basis of the current position X and the previous position, and determines the direction of motion AR2 or AR3 depending upon the positive/negative value of the current velocity X'.

While the operator is depressing the button 10b from the neutral position X=0, the plunger 1c is moved in the direction of allow AR2, and the sensor 1d periodically supplies the current key position X through the multiplexer 3 to the data processor 4. The data processor 4 calculates the current velocity X', which has a positive value, and selects one of the data groups shown in FIG. 7A. The target reaction force F has a negative value, and is directed as indicated by arrow AR4. The controlling unit 8 gradually increases the amount of electric current Ia, and the positive reaction force F is increased together with the distance from the neutral position X=0. The operator feels the increased reaction force F to be the inner force sense. When the button 10b reaches the position X1, the controlling unit 8 does not increase the electric current Ia any more, and the operator 11 feels the reaction force F constant at –F1.

On the other hand, while the operator is upwardly pulling the button 10b, the plunger 1c is moved in the direction of allow AR3, and the sensor 1d periodically supplies the current key position X through the muiltiplexer 3 to the data processor 4. The data processor 4 calculates the current velocity X', which has a negative value, and selects one of the data groups shown in FIG. 7B. The target reaction force F has a positive value, and is directed as indicated by arrow AR5. The controlling unit 8 keeps the electric current 1b constant until the position X1, and the operator feels the reaction force constant at +F1. When the button 10b passes the position X1, the controlling unit 8 gradually decreases the amount of electric current ib, and the positive reaction force F is decreased together with the distance from the neutral position X=0. The operator feels the reaction force F decreased. When the button 10b reaches the neutral position, the controlling unit 8 does not supply the electric current Ib, and the reaction force becomes zero. Thus, the inner force sense controller according to the present invention provides the reaction force F varied with the distance to the button 10b bi-directionally moved along the linear trajectory.

Figure 7A:
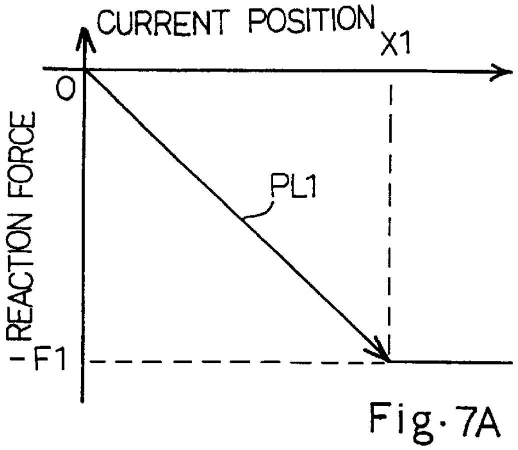
FIGS. 7A to 7D are graph showing different kinds of relation between the position of the button key and force exerted on the button key.
Figure 7B:
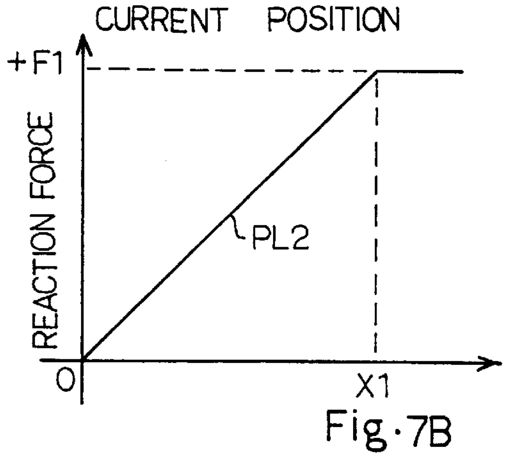
Figure 7C:
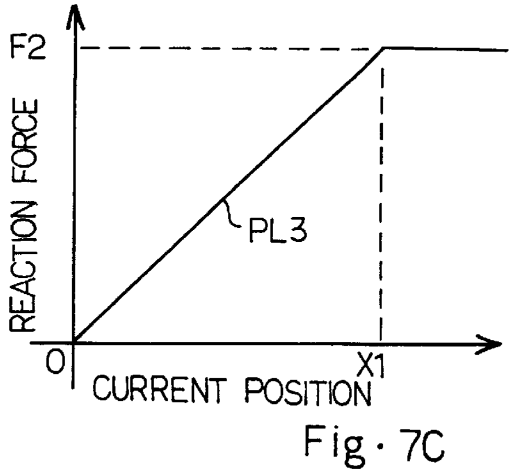
Figure 7D:
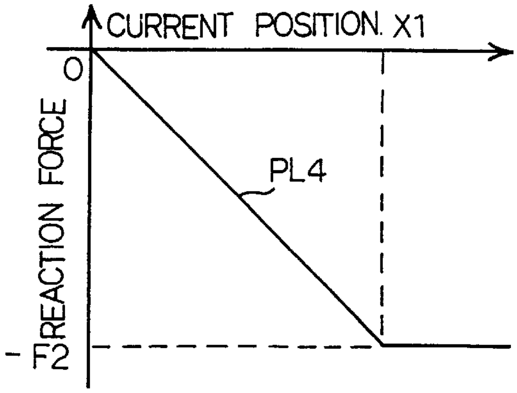

If the data tables store pieces of control data information indicated by plots PL3 and PL4 shown in FIGS. 7C and 7D, the inkier force sense controller differently produces the reaction force F. The pieces of control data information shown in FIGS. 7A and 7B are respectively replaced with the pieces of the control data information shown in figures 7C and 7D, respectively. Moreover, the controlling unit 8 decreases the reaction force F to zero when the button 10*b* stays at any position. In this situation, while the operator is depressing the button 10*b*, the solenoid-operated actuator 1 generates the force F in the same direction as the button 10*b*, and the force F assists the operator. Similarly, while the operator is pulling up the button 10*b*, the solenoid-operated actuator 1 generates the force F in the direction of arrow AR4, and also assists the operator. When the operator stops the button on the way to the position X1, the controlling unit 8 does not supply the electric current to the solenoid-operated actuator 1 any more, and the force F becomes zero. The controlling unit 8 makes the electric current constant after the position X1, and the operator feels the power assist constant at F2 or −F2. Thus, the inner force sense controller according to the present invention serves as a power assist system.

As will be understood from the foregoing description, the inner force sense controller according to the present invention changes the variation of the force F depending upon the direction of the linear motion, and serves as a reaction generator or a power assist system.

Second Embodiment

Figure 8:
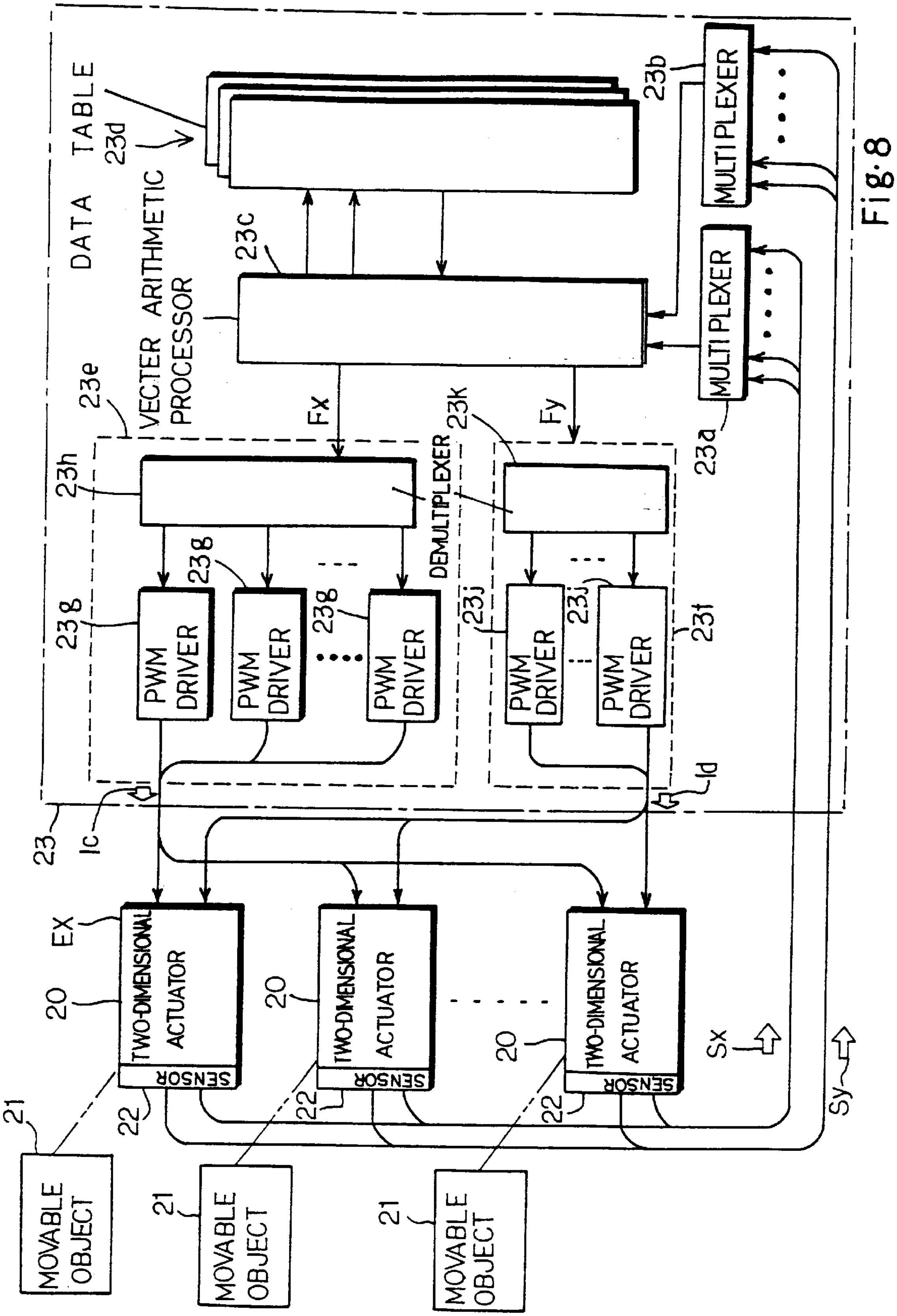
FIG. 8 is a block diagram showing another inner force sense controller according to the present invention.

Turning to FIG. 8 of the drawings, another inner force sense controller embodying the present invention largely comprises two-dimensional actuators 20 for driving movable objects 21, sensors 22 for producing two kinds of positional data information X and Y and a controlling unit 23 responsive to the two kinds of positional data information X/Y for controlling the two-dimensional actuators 20.

Figure 9:
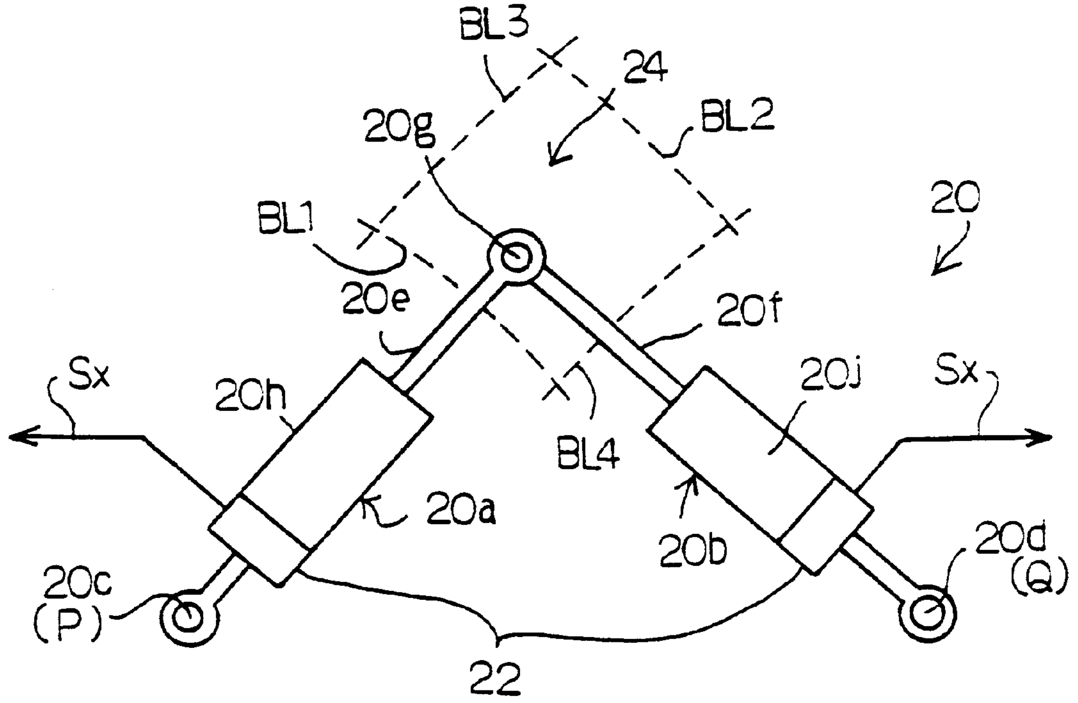
FIG. 9 is a schematic view showing a two-dimensional actuator incorporated in the inner force sense controller.

The two-dimensional actuator 20 is implemented by a combination of two linear actuators, and is illustrated in FIG. 9. Two solenoid-operated linear actuators 20*a*/20*b* are turnable with respect to pins 20*c*/20*d*, and the plungers 20*e*/20*f* are turnably connected to the movable object 21 by mean, of a pin 20*g*. The controlling unit 23 independently supplies driving current I*c* and I*d* to coils 20*h*/20*j*, and the solenoid-operated linear actuators 20*a*/20*b* respectively project the plungers 20*e*/20*f* from the coils 20*h*/20*j* depending upon the amount of driving current I*c*/I*d*. The plungers 20*e*/20*f* exert a resultant force on the moving object, and move the object 21 on a virtual plane 24 where the points 20*c*/20*d*/20*g* are. If the solenoid-operated linear actuator 20*a* keeps the stroke of the plunger 20*e* minimum, the other solenoid-operated linear actuator 20*b* moves the pin 20*g* along broken line BL1 during the projecting motion of the other plunger 20*f*. On the other hand, if the solenoid-operated linear actuator 20*a* keeps the stroke of the plunger 20*e* maximum, the other solenoid-operated linear actuator 20*a* moves the pin 20*g* along broken line BL2 during the projection of the plunger 20*f*. Broken line BL3 indicates the trajectory of the pin 20, during the projection of the plunger 20*e* under the maximum stroke of the plunger 20*f*, and the pin 20*g* traces broken line BL4 during the projection of the plunger 20*e* under the minimum stroke of the plunger 20*f* Thus, the two-dimensional actuator 20 moves the object 21 in the area defined by broken lines BL1, BL2, BL3 and BL4.

The sensor 22 has two sensor elements, and the sensor elements monitorthe plungers 20*e*/20*f*, respectively. The sensor element associated with the solenoid-operated actuator 20*a* generate a first positional signal Sx representative of the current position x of the plunger 20*e*, and the other sensor element associated with the solenoid-operated actuator 20*b* generate a second positional signal Sy representative of the current position y of the plunger 20*f*. The current positions x/y are representative of the distance between the pins 20*c* and 20*g* and between the pins 20*d* and 20*g*, respectively.

The controlling unit 23 includes a first multiplexer 23*a* for assigning a time slot to the first positional signal Sx, a second multiplexer 23*b* for assigning a time slot to the second positional signal Sy, a vector arithmetic processor 23*c*, data tables 23*d* and two driving units 23*e* and 23*f* associated with the solenoid-operated linear actuators 20*a* and the other solenoid-operated linear actuators 20*b*, respectively. The vector arithmetic processor 23*c* fetches the first positional signal Sx and the second positional signal Sy, and determines a first component Fx and a second component Fy in cooperation with the data tables 23*d*. The set of first and second components Fx/Fy is successively determined for each of the two-dimensional actuators 20, and the first component Fx and the second component Fy are transferred to the two driving units 23*e* and 23*f*, respectively.

The first driving unit 23*e* includes a plurality of pwm driver 23*g* respectively associated with the two-dimensional actuators 20 and a demultiplexer 23*h* for distributing the first component Fx to the pwm drivers 23*g*. The second driving unit 23*f* also includes a plurality of pwm drivers 23*j* respectively associated with the two-dimensional actuators 20 and a demultiplexer 23*k* for distributing the second components Fy to the pwm drivers 23*j*. When the first positional signal Sx and the second positional signal Sy are supplied from a certain two-dimensional actuator 20, the vector arithmetic processor 23*c* and the data tables 23*d* determine the first component Fx and the second component Fy for the certain two-dimensional actuator 20, and the first component Fx and the second component Fy are supplied to the pwm drivers 23*g* and 23*j* for the certain two-dimensional actuator 20. The pwm drivers 23*g* and 23*j* regulates the driving, current I*c* and the driving current I*d* to appropriate values corresponding to the components Fx ad Fy, respectively, and the pwm drivers 23*g* and 23*j* supply the driving currents I*c* and I*d* to the solenoid-operated actuators 20*a*/20*b* of the certain two-dimensional actuator 20.

Description is hereinbelow made on the behavior of the two-dimensional actuator labeled with "EX". The sensor elements detect the current position x of the plunger 20*e* and the current position y of the plunger 20*f*, respectively, and the sensor 22 supplies the first positional signal Sx and the second positional signal Sy to the multiplexers 23*a* and 23*b*, respectively. The multiplexers 23*a* and 23*b* assign a time slot to the first positional signal Sx and a corresponding time slot to the second positional signal Sy, and the vector arithmetic processor 23*c* fetches the first and second positional signals Sx and Sy. The vector arithmetic processor 23*c* determines the first component Fx on the basis of the first positional signal Sx and the second component Fy on the basis of the second positional signal Sy.

Figure 10:
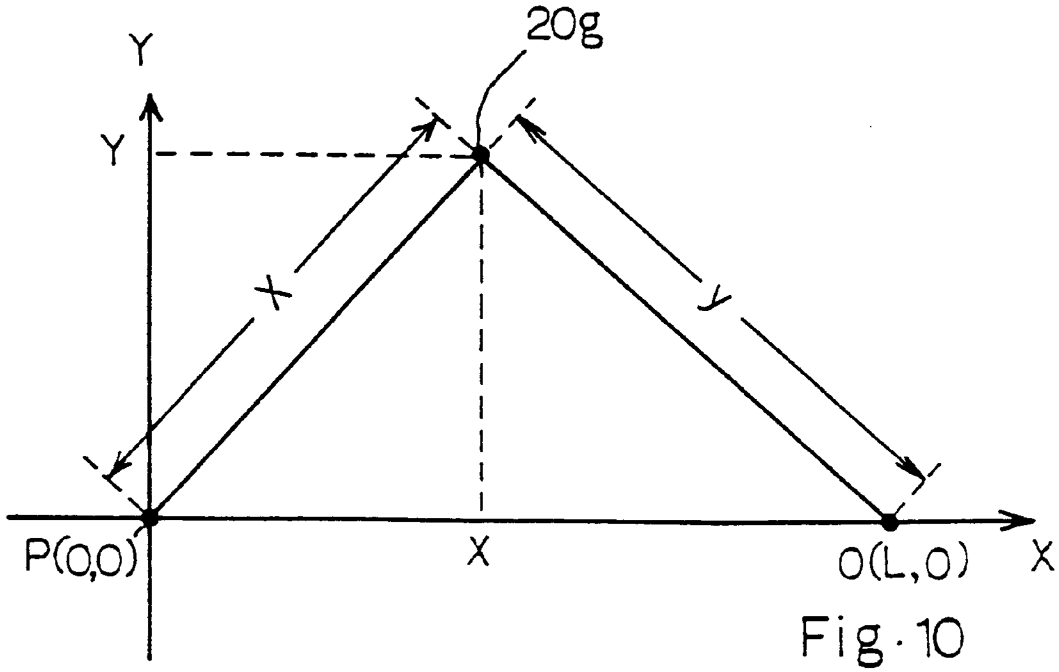
FIG. 10 is an orthogonal coordinates used in the calculation of the position of a moving object.

In detail, the vector arithmetic processor 23*c* carries out a coordinate transformation between the current positions x/y and coordinate (X,Y) of the pin 20*g*, and determines the first and second components Fx and Fy on an orthogonal coordinates. FIG. 10 illustrates the orthogonal coordinates, and pins 20*c*/20*d* are located at points P/Q. Points P/Q are on x-axis, and y-axis crosses x-axis at point P. Coordinates (0,0) and (L,0) are assigned to points P and Q, respectively. The coordinate (X, Y) of the pin 20*g* is calculated on the basis of the current positions x/y and the distance L between the points P and Q. The coordinate (X,Y) represents the current position of the pin 20*g*.

Subsequently, the vector arithmetic processor 23*c* respectively calculates current velocities X' and Y' on the basis of the current position (X,Y) and the previous positions, and further calculates current accelerations X" and Y" on the basis of the current velocities X'/Y' and the previous velocitie s respectively. The current position X, the current velocity X' and the current acceleration X" determine a set of parameters for an equation of motion, and the current position Y, the current velocity X' and the current acceleration X" determine another set of parameters for an equation of motion. These sets of parameters are read out from the data tables 23*d*, and the vector arithmetic processor 23*c* calculates the first reaction component Fx and the second component Fy by using the sets of parameters. The vector arithmetic processor 23*c* supplies data signals representative of the first and second components Fx/Fy to the demultiplexers 23*h*/23*k*.

The sensors 22 generate sets of first/second positional signals Sx/Sy, and the multiplexers 23*a*/23*b* successively transfer the sets of first/second positional signals to the vector arithmetic processor 23*c* in a time sharing fashion. The vector arithmetic processor 23*c* successively determines sets of first/second components Fx/Fy as described hereinbefore, and supplies the sets of first/second components Fx/Fy to the demultiplexers 23*h*/23*k* in the time sharing fashion. The pwm drivers 23*g* are respectively paired with the pwm drivers 23*j*, and form pairs of pwm drivers 23*g*/23*j*. The demultiplexers 23*h*/23*k* distribute the sets of first/second components Fx/Fy to the pairs of pwm drivers 23*g*/23*j*, respectively, in such a manner that the two-dimensional actuators 20 exert the first/second components Fx/Fy to the associated moving objects 21, respectively. The pairs of pwm drivers 23*g*/23*j* regulates the amount of driving current I*c* and the amount of driving current I*d* to appropriate values corresponding to the first/second components Fx/Fy. The pairs of pwm drivers 23*g*/23*j* supply the driving currents I*c*/I*d* to the associated two-dimensional actuators 20, and the two-dimensional actuators 20 generate the sets of components Fx/Fy, respectively. The first and second components Fx/Fy compose the resultant force F, and the resultant force F is exerted on the moving object 21.

In this way, the inner force sense controller monitors the two-dimensional actuators 20, and provides the resultant forces F appropriate at each moment to the moving objects 21. Although only one set of vector arithmetic processor 23*c* and data tables 23*d* is incorporated in the inner force sense controller, the sets of positional signals Sx/Sy and the sets of data signals are supplied to and form the vector arithmetic processor 23*c* in the time sharing fashion. For this reason, the circuit configuration becomes simple.

The inner force sense controller described hereinbefore may determine the resultant force F depending upon the current position of the pin 20*g*, as similar to the slide switch shown in FIGS. 4A to 4C. In this instance, the current velocity X' and the current acceleration X" are zero in the equation of motion at all times. The current positions X and Y specify the position of the pin 20*g*, and the coordinate transformation is not required. The relation between the current positions X/Y and the first and second reaction components Fx/Fy is stored in the data tables 23*d*, and the processor 23*c* specifies the first and second reaction components Fx/Fy so as to read out them from the data tables 23*d*. The processor 23*c* supplies the data signals representative of the first/second reaction components Fx/Fy through the demultiplexers 23*h*/23*k* to the pair of pwm drivers 23*g*/23*j* associated with the two-dimensional actuator 20 locating the moving object 21 at coordinate (X, Y), and the pair of pwm drivers 23*g*,/23*j* regulates the driving currents I*c*/I*d* to appropriate values corresponding to the reaction components Fx/Fy.

The inner force sense controller may determines the first and second reaction components Fx/Fy depending upon the position of the pin 20*g* and the direction of manipulating force exerted on the moving object 21 as similar to the button key shown in FIG. 6. In this instance, the vector arithmetic processor 23*c* carries out the coordinate transformation, and determines the coordinate (X, Y) of the pin 20*g*. Subsequently, the processor 23*c* calculates the current velocities X' and Y' on the basis of the current positions X/Y and the previous positions, and determines the directions of motion for the plungers 20*e*/20*f*. The first/second reaction components Fx/Fy are grouped by the directions of motion. The processor 23*c* firstly specifies a group of first reaction components corresponding to the direction of motion and a group of second reaction components corresponding to the direction of motion, and selects one of the first reaction components from the selected group and one of the second reaction components from the selected group. The selected first reaction component Fx and the selected second reaction component Fy are supplied through the demultiplexers 23*h*/23*k* to one of the pairs of pwm drivers 23*g*/23*j*. The pwm drivers 23*g*/23*j* regulates the driving currents I*c*/I*d* to appropriate values corresponding to the first/second reaction components Fx/Fy.

Third Embodiment

Figure 11:
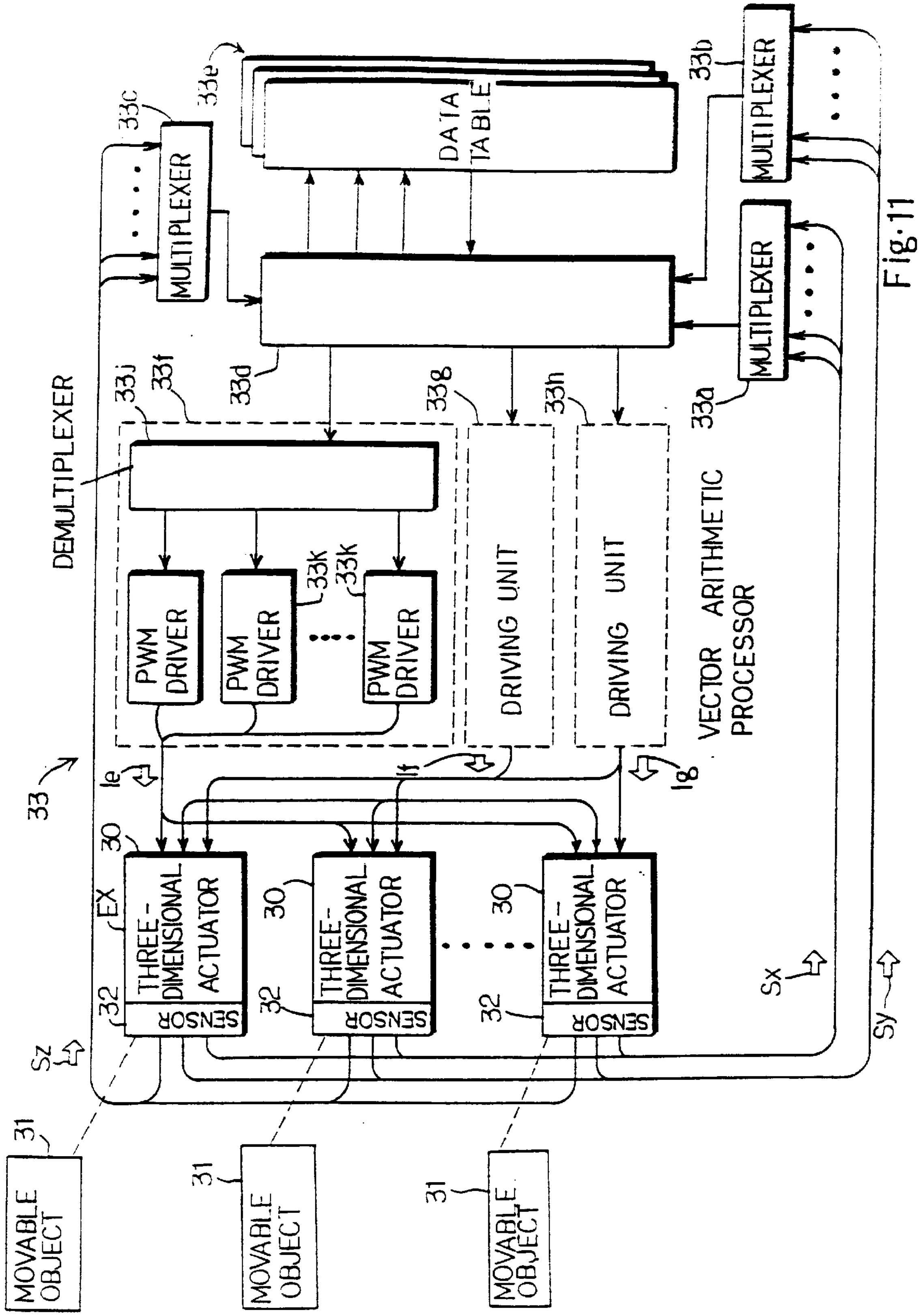
FIG. 11 is a block diagram showing yet another inner force sense controller according to the present invention.

Turning to FIG. 11 of the drawings, yet another inner force sense controller embodying the present invention largely comprises three-dimensional actuators 30 for driving movable objects 31, sensors 32 for producing three kinds of positional data information X, Y and Z and a controlling unit 33 responsive to the three kinds of positional data information X/Y/Z for controlling the three-dimensional actuators 30.

Figure 12:
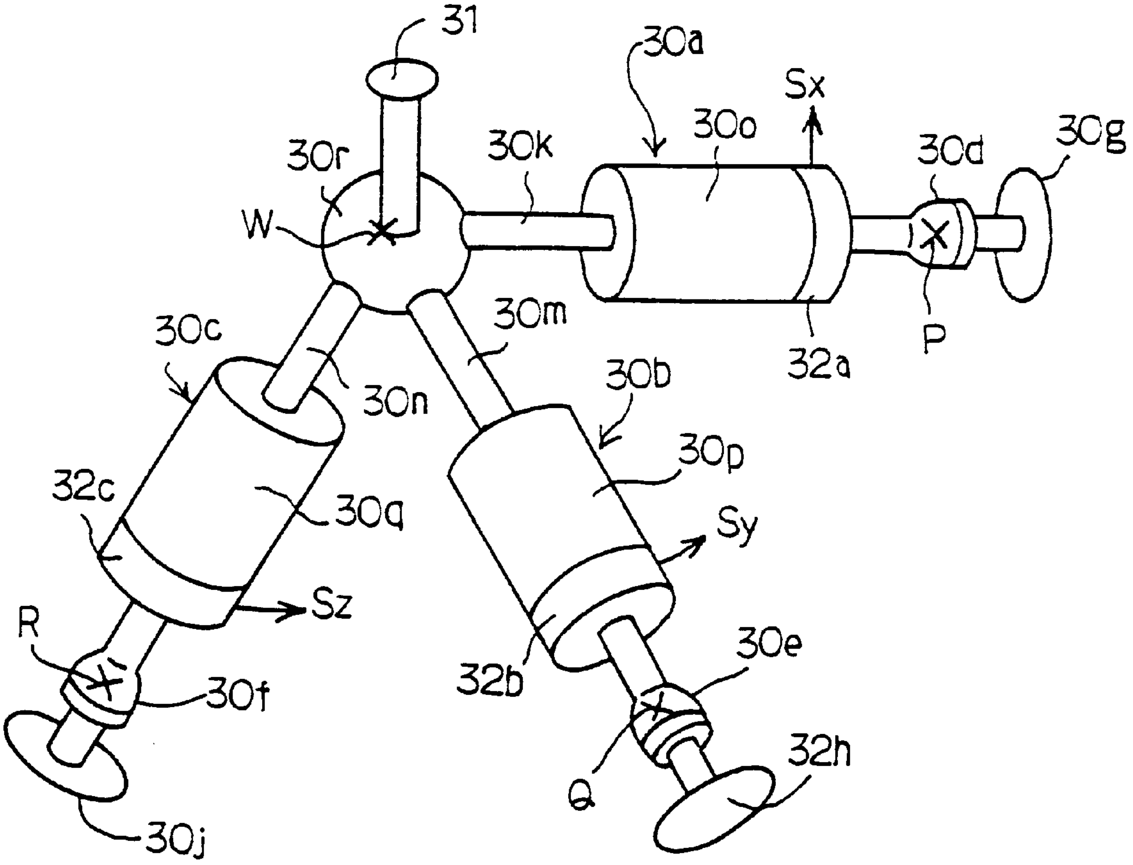
FIG. 12 is a perspective view showing a three-dimensional actuator incorporated in the inner force sense controller shown in FIG. 11.

The three-dimensional actuator 30 is implemented by a combination of three solenoid-operated linear actuators 30*a*/30*b*/30*c*, and the three solenoid-operated linear actuators 30*a*/30*b*/30*c* are orthogonally arranged as shown in FIG. 12. The three solenoid-operated linear actuators 30*a*/30*b*/30*c* are respectively connected to universal joints 30*d*/30*e*/30*f*, and the universal joints 30*d*/30*e*/30*f* are respectively fixed to stationary members 30*g*/30*h*/30*j*. The solenoid-operated actuators 30*a*/30*b*/30*c* freely turn around points P/Q/R, respectively. Plungers 30*k*/30*m*/30*n* are projectable into and retractable into coils 30*o*/30*p*/30*q*, and the plungers 30*k*/30*m*O/30*n* are turnably connected to a manipulator serving as the movable object 31 by means of a universal joint 30*r*. The controlling unit 33 independently supplies driving current I*e*, I*f* and I*g* to coils 30*o*/30*p*/30*q*, and the solenoid-operated linear actuators 30*a*/30*b*/30*c* respectively project the plungers 30*k*/30*m*/30*n*, from the coils 30*o*/30*p*/30*q* depending upon the amount of driving current I*e*/I*f*/I*g*. The components Fx/Fy/Fz are exerted on the universal joint 30*r*, and compose a resultant force F at point W. The current position x/y/z represents the distances from the point W to the points P/Q/R.

The sensor 32 has three sensor elements 32*a*/32*b*/32*c*, and the sensor elements 32*a*/32*b*/32*c* monitor the plungers 30*k*/30*m*/30*n*, respectively The sensor element 32*a* generates a first positional signal Sx representative of the current position x of the plunger 30*k*, another sensor element 32*b* supplies a second positional signal Sy representative of the current position y of the plunger 30*m*, and yet another sensor element 32*c* generates a third positional signal Sz representative of the current position z of the plunger 30*n*.

The controlling unit 33 is similar to the controlling unit 23 and includes multiplexers 33*a*/33*b*/33*c*, a vector arithmetic processor 33*d*, data tables 33*e* and three driving units 33*f*/33*g*/33*h*. The driving units 33*f*/33*g*/33*h* are identical in circuit arrangement to one another, and includes a demultiplexer 33*j* and pwm drivers 33*k*. The controlling unit 33 successively processes the sets of first/second/third positional signals Sx/Sy/Sz so as to determine sets of the components Fx, Fy and Fz in a similar manner to the controlling unit 23. The controlling unit 33 regulates the driving currents I*e*/I*f*/I*g* to appropriate values corresponding to the components Fx/Fy/Fz. The driving currents are supplied to each of the three-dimensional actuators 30, and exerts the resultant force F to the associated manipulator or the moving, object 31.

Description is hereinbelow made on the behavior of the three-dimensional actuator labeled with "EX". The sensor elements 32*a*/32*b*/32*c* detect the current position x of the plunger 30*a*, the current position y of the plunger 30*b* and the current position z of the plunger 30*c*, respectively, and the sensor 32 supplies the positional signals Sx/Sy/Sz to the multiplexers 33*a*, 33*b* and 33*c*, respectively. The multiplexers 33*a*, 33*b* and 33*c* respectively assign time slots to the positional signals Sx/Sy/Sz, and the vector arithmetic processor 33*d* fetches the positional signals Sx, Sy and Sz. The vector arithmetic processor 33*d* determines the components Fx, Fy and Fz on the basis of the positional signals Sx, Sy and Sz, respectively.

In detail, the vector arithmetic processor 33*d* carries out a coordinate transformation between the current positions x/y/z and coordinate (X,Y,Z) of the point W, and X-axis, Y-axis and Z-axis after the transformation define coordinates used in an equation of motion.

Subsequently, the vector arithmetic processor 33*d* respectively calculates current velocities X', Y' and Z' on the basis of the current position (X,Y,Z) and the previous position, and further calculates current accelerations X", Y" and Z" on the basis of the current velocities X'/Y'/Z' and the previous velocities, respectively. The current position X, the current velocity X' and the current acceleration X" determine a set of parameters for an equation of motion in the direction of X-axis. Similarly, the current position Y, the current velocity X' and the current acceleration X" determine another set of parameters for an equation of motion in the direction of Y-axis, and the current position Z, the current velocity Z' and the current acceleration Z" determine yet another set of parameters for an equation of motion in the direction of Z-axis. These sets of parameters are read out from the data tables 33*e*, and the vector arithmetic processor 33*d* calculates the components Fx, Fy and Fz by using the sets of parameters. The vector arithmetic processor 33*d* supplies data signals representative of the components Fx/Fy/Fz to the demultiplexers 33*j* of the driving units 33*f*/33*g*/33*h*, respectively, and the demultiplexers 33*f* transfer the components Fx/Fy/Fz to the pwm drivers 33*k* associated with the three-dimensional actuator "EX". The pwm drivers 33*k* regulates the driving currents I*e*/I*f*/I*g* to appropriate values corresponding to the components Fx/Fy/Fz, and supply the driving currents I*e*/I*f*/I*g* to the three-dimensional actuator "EX".

The sensors 22 generate sets of positional signals Sx/Sy/Sz, and the multiplexers 33*a*/33*b*/33*c* successively transfer the sets of positional signals Sx/Sy/Sz to the vector arithmetic processor 33*d* in a time sharing fashion. The vector arithmetic processor 33*d* successively determines sets of components Fx/Fy/Fz as described hereinbefore, and supplies the sets of components Fx/Fy/Fz to the demultiplexers 33*j* of the driving units 33*f*/33*g*/33*h* in the time sharing fashion. Three pwm drivers 33*k* form sets of pwm drivers 33*k*, and the demultiplexers 33*j* distribute the data signals representative of the sets of components Fx/Fy/Fz to the sets of pwm drivers 33*k*, respectively, in such a manner that the associated three-dimensional actuators 32 exert the sets of components Fx/Fy/Fz on the associated moving objects 31, respectively. The sets of pwm drivers 33*k* regulate the amounts of driving currents I*e*/I*f*/I*g* to appropriate values corresponding to the given components Fx/Fy/Fz. The sets of pwm drivers 33*k* supply the driving currents I*e*/I*f*/I*g* to the associated three-dimensional actuators 30, and the three-dimensional actuators 30 generate the sets of components Fx/Fy/Fz, respectively. The components Fx/Fy/Fz compose a resultant force F, and the resultant force F is exerted on the moving object 31.

In this way, the inner force sense controller monitors the three-dimensional actuators 30, and provides the resultant forces F appropriate at each moment to the three-dimensional motions of the object 31. Although only one set of vector arithmetic processor 33*d* and data tables 33*e* is incorporated in the inner force sense controller, the sets of positional signals Sx/Sy/Sz and the sets of data signals are supplied to and form the vector arithmetic processor 33*d* in the time sharing, fashion. For this reason, the circuit configuration becomes simple.

The moving object 31 or the manipulator may have the moving object 31 at a neutral position when the solenoid-operated linear actuators 30*a*/30*b*/30*c* project the plungers 30*k*/30*m*/30*n* by half of each stroke. The three-dimensional actuator 30 venerates the reaction force F or resistance to the three-dimensional motion of the moving object 31, and the reaction force F is increased together with the distance from the neutral position. The reaction force F is only dependent on the distance from the neutral position, and the velocity and the acceleration are zero in the equation of motion at all times. The coordinate transformation is not required, and the data tables 33*e* store the relation between the reaction components Fx/Fy/Fz and the current positions x/y/z, and the processor 33*d* simply reads Out a set of reaction components Fx/Fy/Fz corresponding to the current positions x/y/z from the data tables 33*e*. The processor 33*d* supplies the data signals representative of the reaction components Fx/Fy/Fz through the demultiplexers 33*j* to the pwm drivers 33*k*, and the pwm drivers regulates the driving currents I*e*/I*f*/I*g* to appropriate values for producing the reaction components Fx/Fy/Fz. The driving current is supplied to the three-dimensional actuator 30, and the three-dimensional actuator 30 exerts the resultant force F on the moving object 31.

The inner force sense controller may determines the components Fx/Fy/Fz depending upon the position of the moving object 31 and the direction of manipulating force exerted on the moving object 31 as similar to the button key shown in FIG. 6. In this instance, the vector arithmetic processor 33*d* carries out the coordinate transformation, and determines the coordinate (X,Y,Z) of the point W. Subsequently, the processor 33*d* calculates the current velocities X', Y' and Z' on the basis of the current positions X/Y/Z and the previous positions, and determines the directions of motion for the plungers 30*k*/30*m*/30*n*. The components Fx/Fy/Fz are grouped by the direction of motion in the data tables 33*e*. The processor 33*d* firstly specifies a group of components Fx for the plunger 30*k* moved in the given direction, a group of components Fy for the plunger 30*m* moved in the given direction and a group of components Fz for the plunger 30*n* moved in the given direction, and selects one of the components Fx from the selected group, one of the components Fy from the selected group and one of the components Fz from the selected group. The selected components Fx/Fy/Fz are supplied through the demultiplexers 33*j* to the pwm drivers 33*k*, and the pwm drivers 33*k* regulate the driving currents Ie/If/Ig to appropriate values for generating, the components Fx/Fy/Fz.

Fourth Embodiment

Figure 13:
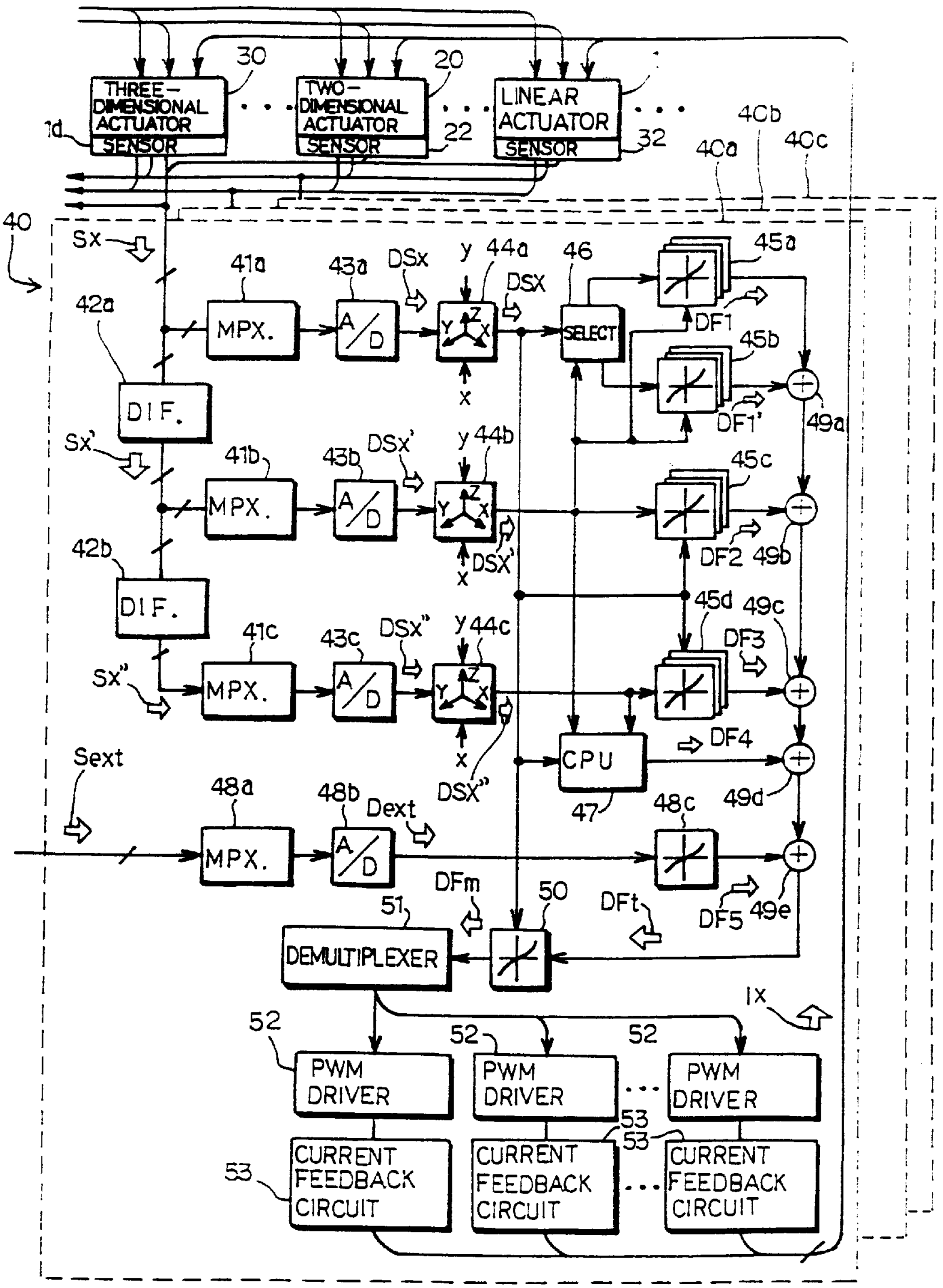
FIG. 13 is a block diagram showing another inner force sense controller according to the present invention.

FIG. 13 illustrates still another inner force sense controller embodying the present invention, and the inner force sense controller is equipped with the linear actuators 1, the two-dimensional actuators 20 and the three-dimensional actuators 30. The linear actuators 1 are respectively connected to linearly moving objects (not shown), the two-dimensional actuators 20 are respectively connected to two-dimensionally moving objects (not shown), and the three-dimensional actuators 30 are respectively connected to three-dimensionally moving objects (not shown). The sensors 1*d*, 22 and 32 are associated with the actuators 1/20/30, and monitor the plungers so as to produce the analog positional signals Sx, Sx/Sy. The analog positional signals Sx, Sy and Sz are representative of the strokes of the plungers of the solenoid-operated actuators. If the analog positional signal Sx is supplied from the linear actuator 1, the analog positional signals Sy and Sz are assumed to be zero. Similarly, the analog positional signal Sz from the two-dimensional actuator is assumed to be zero.

The inner force sense controller further comprises a controlling unit 40 integrated on a semiconductor chip. Although the controlling unit 40 includes three controlling sub-units 40*a*, 40*b* and 40*c* respectively processing the analog positional signals Sx, Sy and Sz, only one controlling, sub-unit 40*a* for the analog positional signal Sx is shown and described hereinbelow. The other controlling sub-units 40*b* and 40*c* are analogous in arrangement and behavior to the controlling, sub-unit 40*a*.

The controlling sub-unit 40*a* includes multiplexers 41*a*, 41*b* and 41*c* and two groups of differentiators 42*a* and 42*b*. The multiplexer 41*a* is connected through signal lines assigned to the analog positional signals Sx to the sensors 1*d*/22/32, and periodically provides a signal path to the analog positional signals Sx. In other words, the multiplexer 41*a* assigns time slots to the analog positional signals Sx, respectively, and serially outputs the analog positional signals Sx.

The differentiators 42*a* are equal in number to the actuators 1*d*/22/32, and are also connected through the signal lines for the analog positional signals Sx to the sensors 1*d*/22/32. The differentiators 42*a* differentiates the current positions X, and respectively produce analog velocity signals Sx' each representative of the current velocity. The differentiators 42*a* supply the analog velocity signals Sx' to the multiplexer 41*b* and the other group of differentiators 42*b*. The multiplexers 41b also periodically provide a signal path to the analog velocity signals Sx'. Thus, the multiplexer 41*b* assigns time slots to the analog velocity signals Sx', respectively, and serially outputs the analog velocity signals Sx' therefrom.

The differentiators 42*b* are equal in number to the differentiators 42*a*, and differentiate the analog velocity signals Sx' so as to determine current accelerations.

The differentiators 42*b* respectively produce analog acceleration signals Sx" representative of the current accelerations, and supply them to the multiplexers 41*c*. The multiplexer 41*c* periodically supplies a signal path to the analog acceleration signals Sx", and serially outputs the analog acceleration signals SX" therefrom.

The controlling sub-unit 40*a* further includes analog-to-digital converters 43*a*, 43*b* and 43*c* connected in parallel to the multiplexers 41*a*, 41*b* and 41*c*, respectively, and the. The analog-to-digital converters 41*a*, 41*b* and 41*c* convert the analog positional signal Sx, the analog velocity signal Sx' and the analog acceleration signal Sx" to a digital positional signal DSx, a digital velocity signal DSx' and a digital acceleration signal DSx", respectively.

The controlling sub-unit 40*a* further includes coordinate transforming tables 44*a*, 44*b* and 44*c*, and the coordinate transforming tables 44*a*, 44*b* and 44*c* carry out a coordinate transformation on the digital positional signal Sx, the digital velocity signal Sx' and the digital acceleration signal Sx". A digital positional signal DSX, a digital velocity signal DSX' and a digital acceleration signal DSX" are output from the coordinate transforming tables 44*a*, 44*b* and 44*c*.

The controlling sub-unit 40*a* further includes a pair of data tables 45*a*/45*b* for storing first component data codes DF1/DF1' each representative of a first component force F1, a data table 45*c* for storing second component data codes DF2 each representative of a second component force F2 and a data table 45*d* for storing third component data codes DF3 each representative of a third component force DF3. The first component data codes DF1 stored in the data table 45*a* are available for controlling the objects moved in one direction such as a projecting direction, and the first component data codes stored DF1' in the other data table 45*b* are used for controlling the objects moved in the opposite direction or a retracting direction. The first component data codes DF1/DF1' in each data table 45*a*/45*b* are grouped by the velocity, and the first component data codes DF1/DF1' for a certain velocity form a data sub-table.

Similarly, the second component data codes DF2 are grouped by the position so as to form data sub-tables selective by using the digital positional signal DSX, and the third component data codes DF3 are also Grouped by the position so as to form data sub-tables selective by using the digital positional signal DSX. For this reason, the digital positional signal DSX and the digital velocity signal DSX' are supplied to the data table 45*c*, and the digital positional signal DSX and the digital acceleration signal DSX" are supplied to the data table 45*d*.

The controlling sub-unit 40*a* further includes a selector 46 connected between the coordinate transforming table 44*a* and the pair of data tables 45*a*/45*b*. The selector 46 is responsive to the digital velocity signal DSX' for steering the digital positional signal DSX to one of the data tables 45*a*/45*b*. The digital velocity signal DSX' has a sign bit representative of a positive value or a negative value, and the positive sign bit and the negative sign bit are corresponding to the projection of the plunger and the retraction of the plunger, respectively. For this reason, the selector 46 is responsive to the sign bit for steering the digital positional signal DSX to either data table 45*a* or 45*b*. When the digital positional signal DSX is not supplied to the data table 45*a*/45*b*, the data table 45*a*/45*b* outputs the first component data code DF1/DF1' of zero.

The digital velocity signal DSX' is further supplied to the pair of data tables 45*a*/45*b*. One of the data sub-tables is selected from one of the data tables 45*a*/45*b*, and the digital positional signal DSX selects one of the first component data codes from, the selected data sub-table.

The controlling sub-unit 40*a* further includes a central processing unit 47, and the central processing unit 47 periodically increments internal timer for measuring lapse of time from the initiation of operation. The digital positional signal DSX, the digital velocity signal DSX' and the digital acceleration signal DSX" are supplied to the central processing unit 47, and the central processing unit 47 takes the lapse of time and the current position/current velocity/current acceleration into account so as to output a fourth component data code DF4 representative of a fourth component force F4.

The controlling sub-unit 40*a* further includes a multiplexer 48*a* connected to an external signal source such as a volume controller (not shown), an analog-to-digital converter 48*b* connected to the multiplexer 48*a* and a data table 48*c* connected to the analog-to-digital converter 48*b*. External analog signals Sext are supplied in parallel to the multiplexer 48*a*, and are, by way of exam-ple, representative of basic component forces exerted on the respective objects. The multiplexer 48*a* assigns time slots to the external analogs signals Sext, respectively, and the external analog signals Sext are serially supplied to the analog-to-digital converter 48*b*. The analog-to-digital converter 48*b* converts the external analog signals Sext to digital signals Dext, and the digital signals Dext are supplied to the data table 48*c* The digital signal Dext specifies one of the fifth component data codes DF5, and the selected fifth component data code DF5 is read out from the data table 48*c*. The fifth component data code DF5 is representative of the basic component force, and user can modifies the force F exerted on each moving object by changing the fifth component force F5. The external analog signal flay represent a piece of warning information or a piece of trigger information. For example, when a trouble takes place, the external signal source makes the moving object heavy so as to inform the manipulator of the trouble.

The controlling sub-unit 40*a* further includes adders 49*a*, 49*b*, 49*c*, 49*d* and 49*e* arranged in series, and the first to fifth component data codes DF1 to DF5 are selectively supplied to the adders 49*a* to 49*e*. The first to fifth component data codes are added to one another, and the adder 49*e* outputs a digital target force signal DFt.

The controlling sub-unit 40*a* further includes a modification table 50, a demultiplexer 51, pwm drivers 52 and current feedback circuits 53. A solenoid-operated actuator differently varies the thrust of the plunger between the projection of the plunger and the retraction thereof. In other words, the solenoid-operated actuator changes the thrust along a hysteresis loop. This means that the amount of driving current should be modified between the projection and the retraction. Moreover, the thrust generating characteristics are different between different models of solenoid-operated actuators. The modification table 50 changes the target force Ft to a modified target force Fm appropriate to the actuator 1/20/30 with the plunger at the current position on one of the projection and the retraction. The modification table 51 has a plurality of sub-tables assigned to positions along the trajectory of the plunger and one of the sub-tables is selected by using the digital positional signal DSX. The digital target force signal DFt specifies a digital modified force signal DFm in the selected sub-table, and the digital modified force signal DFm is supplied to the demultiplexer 51. In this way, the digital modified force signals DFm for the actuators 1/20/30 are successively supplied from the modification table 50 to the demultiplexer 51, and the demultiplexer 51 distributes the digital modified force signals DFm to the pwm drivers 52 respectively associated with the actuators 1/20/30. The pwm driver 52 regulates driving current Ix to appropriate value equivalent to the modified target force Fm, and the current feedback circuit 53 supplies the driving current Ix to one of the actuators 1/20/30 to be controlled. Tile current feedback circuit 53 constantly supplies the driving current Ix regardless of the temperature rise of the coil.

Assuming now that the linear actuator 1, the two-dimensional actuator 20 and the three-dimensional actuator 30 concurrently drive the associated moving objects. The sensors 1*d*/22/32 monitor the associated actuators 1/20/30, and produce the analog positional signal Sx and the analog positional signals Sx/Sy and Sx/Sy/Sz. The analog positional signal Sy or signals Sy/Sz are processed as similar to the analog positional signal Sx, and, for this reason, description is forced on the analog positional signals Sx, only.

The analog positional signals Sx are supplied in parallel from the sensors 1*d*/22/32 to the multiplexer 41*a* and the differentiators 42*a*. The differentiators 42*a* differentiate the analog positional signals Sx, and supply the analog velocity signals Sx' representative of the current velocities to the multiplexer 41*b* and the differentiators 42*b*. The differentiators 42*b* calculate the current accelerations, and supply the analog acceleration signals Sx" to the multiplexer 41*c*.

The multiplexer 41 a successively supplies the analog positional signals Sx to the analog-to-digital converter 43*a*, and the analog-to-digital converter 43*a* converts the analog positional signals Sx to the digital positional signals DSx. Similarly, the multiplexer 41*b* successively supplies the analogy velocity signals Sx' to the analog-to-digital converter 43*b*, and the analog-to-digital converter 43*b* converts the analog velocity signals Sx' to the digital signal signals DSx'. The multiplexer 41*c* also successively supplies the analog acceleration signals Sx" to the analog-to-digital converter 43*c*, and the analog-to-digital converter 43*c* converts the analog acceleration signals Sx" to the digital acceleration signals DSx". One of the analog positional signals Sx is assigned to a certain time slot, and the analog velocity signal Sx' and the analog acceleration signal Sx" are respectively assigned to time slots synchronism with the certain time slot. For this reason, the analog positional signal Sx, the analog velocity signal Sx' and the analog acceleration signal Sx" for a certain actuator are simultaneously processed.

The digital positional signal DSx, the digital velocity signal DSx' and the digital acceleration signal DSx" are supplied to the coordinate transforming tables 44*a*, 44*b* and 44*c*, respectively, and are converted to the digital positional signal DSX, the digital velocity signal DSX' and the digital acceleration signal DSX", respectively. The coordinate transforming tables 44*a* to 44*c* require the other current positions y/z for the coordinate transformation, and the current positions y and z are supplied form the other controlling Sub-units 40*b* and 40*c*. If the digital positional signal DSx is representative of the current position x of the linear actuator 1, the other current positions y and z are assumed to be zero. Similarly, if the digital positional signal DSx is representative of the current position x of the two-dimensional actuator 20, the current position y is assumed to be zero.

The external analog signals Sext are also supplied to the multiplexer 48*a*, and the multiplexer 48*a* assigns time slots to the external analog signals Sext, respectively. The external analog signal Sext for a certain actuator 1/20/30 is assigned to the time slot synchronism with the time slots assigned the analog positional signal Sx, the analog velocity signal Sx' and the analog acceleration signal Sx" for the certain actuator 1/20/30. The analogy-to-digital converter 48*b* converts the external analog signals Sext to the digital signals Dext, if any. The digital signals Dext are supplied to the data table 48*c*, and the fifth component data code DF5 is supplied to the adder 49*e*.

The digital positional signal DSX, the digital velocity, signal DSX' and the digital acceleration signal DSX" are supplied to the central processing unit 47, and the central processing unit 47 checks the internal tinier to see how long it has been from the initiation of the controlling operation. The central processing unit 47 determines the fourth component force F4, and outputs the fourth component data code DF4. The fourth component data code DF4 is supplied to the adder 49*d*.

The digital velocity signal DSX' is supplied to the selector 46, and the selector 46 steers the digital positional signal DSX to one of the data tables 45*a*/45*b*. For this reason, the digital positional DSX, the digital velocity signal DSX' and the digital acceleration signal DSX" are concurrently supplied to the data tables 45*a*/45*b*, 45*c* and 45*d*, respectively. The first component data code DF1/DF1', the second component data code DF2 and the third component data code DF3 are read out from the data tables 45*a*/45*b*, 45*c* and 45*d*, and are supplied to the adders 49*a* to 49*c*.

The adders 49 to 49*e* sequentially add the first to fifth component data codes DF1 to DF5, and determine the total target force Ft as follows.

$$Ft=MX''+\rho X'+\kappa X+f1+f2 \qquad \text{equation 1}$$

where κX is given by the first component data code DF1/DF1' determined by the selector 46, the data tables 45*a*/45*b* and the adder 49*a*, ρX' is given by the second component data code DF2 read out from the data table 45*c* and MX" is given by the third component data code DF3 read out from the data table 45*d*. The digital velocity signal DSX' and the digital positional signal DSX specify the second component data code DF2. ρX' is representative of a parameter due to a viscosity coefficient. If the linear actuator 1 is associated with the button switch shown in FIG. 6, the value of ρX' is gradually increased together with the distance from the neutral position, and, accordingly, the second component force F2 due to the viscous load is gradually increased together with the distance. MX" is given by the third component data code DF3, and is determined by using the current position and the current acceleration. The third component force F3 is caused by an inertial load.

The adder 49*e* sequentially supplies the digital target force signals DFt to the modification table 50. One of the sub-tables is selected from the modification table 50 for each of the digital target force signals DFt, and is assigned to the current position of the actuator to be controlled with the target force Ft. Each of the digital target force signals DFt specifies one of the modified forces Fm in the selected sub-table, and the selected sub-table outputs the digital modified force signal DFm. Thus, the digital modified force signals DFm are successively output from the modification table 50, and are supplied to the demultiplexer 51.

The demuiltiplexer 51 distributes the digital modified force signals DFm to the pwm drivers 52 associated with the actuators 1/20/30, and the associated current feedback circuits 53 supply the driving currents I*x* to the actuators 1/20/30, and the actuators 1/20/30 exert the modified forces Fm on the associated moving objects, respectively.

The inner force sense controller shown in FIG. 13 takes various force components F2, F3, F4 and F5 into account, and gives appropriate inner force sense to the operator of the moving, objects. Moreover, the inner force sense controller is integrated on a single semiconductor chip, and the single semiconductor chip is installed in any kind of virtual reality system.

Fifth Embodiment

Figure 14:
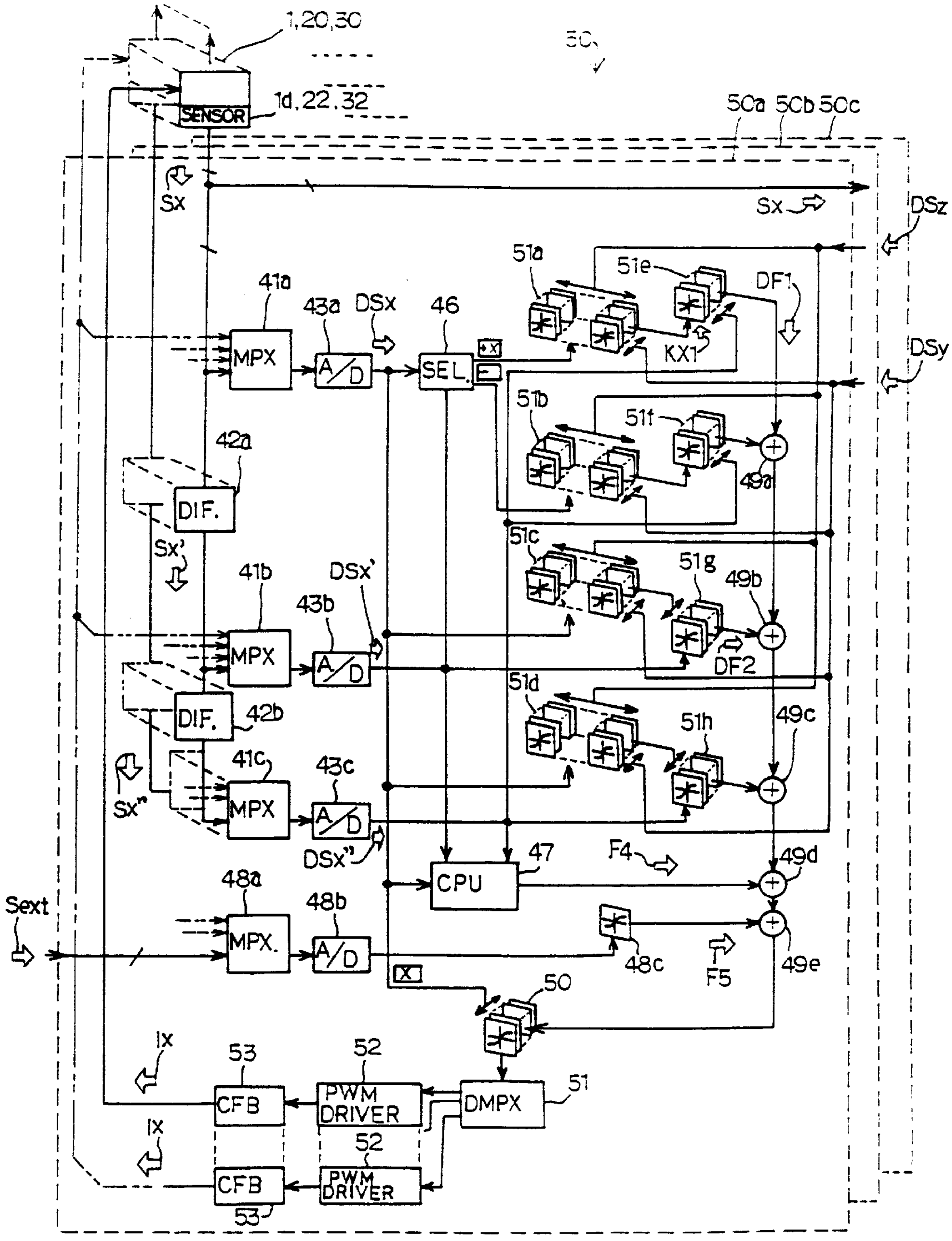
FIG. 14 is a block diagram showing another inner force sense controller according to the present invention.
Figure 15:
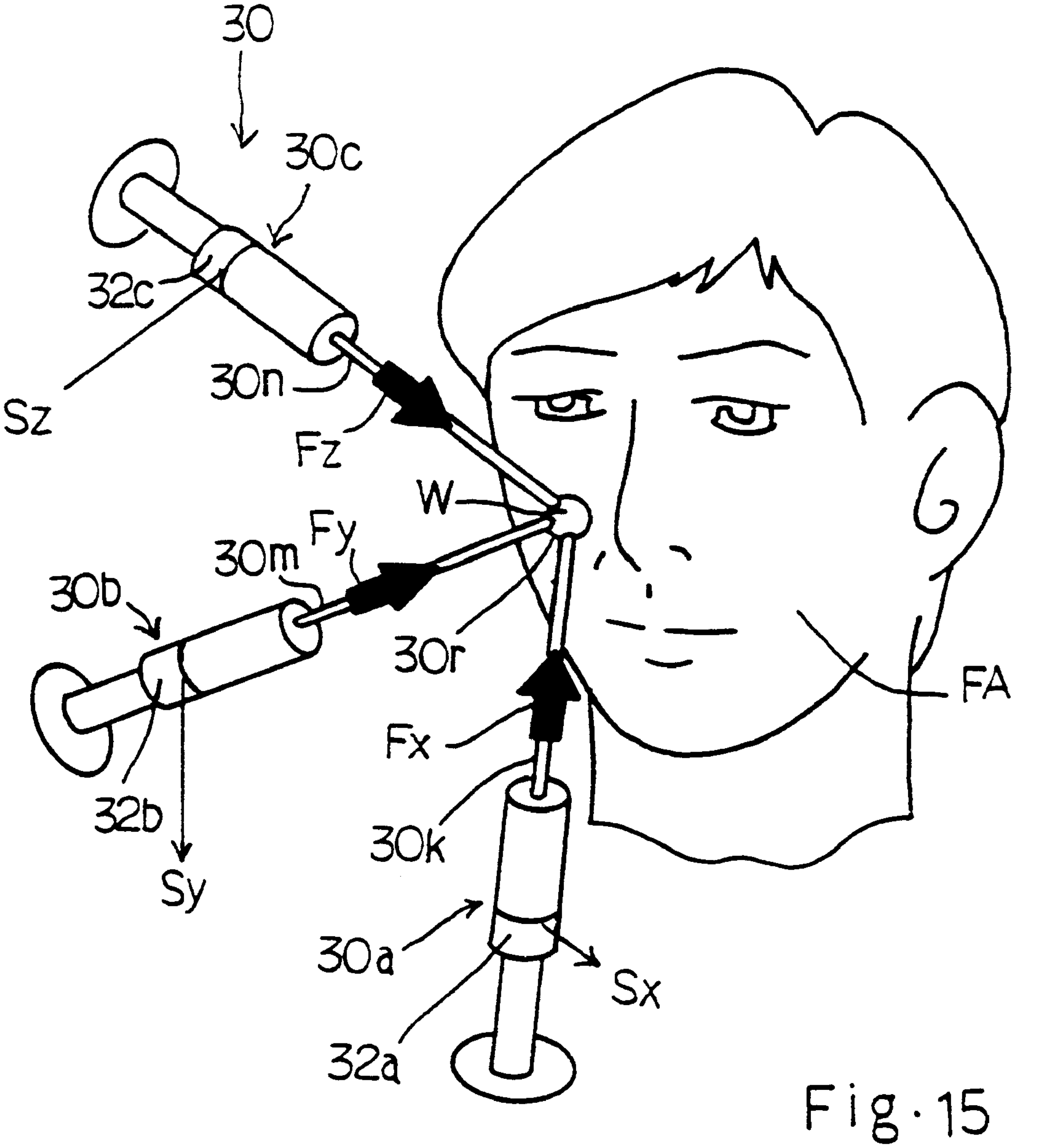
FIG. 15 is a schematic view showing a control of inner force sense on a human face.

FIG. 14 illustrates another inner force sense controller embodying the present invention. The inner force sense controller implementing the fourth embodiment converts the current position x, y, z representative of the distances to coordinate (X,Y,Z) of the moving object through the coordinate transformation. The inner force sense controller implementing the fifth embodiment directly determines target force to be exerted on a moving object from the current position x, y, z by using data tables.

The inner force sense controller implementing the fifth embodiment largely comprises the three kinds of actuator i.e., the linear actuators 1, the two-dimensional actuators 20 and the three-dimensional actuators 30, the sensors 1*d*, 22 and 32 associated with these actuators 1, 20 and 30 and a controlling unit 50 connected between the sensors 1*d*, 22 and 32 and the actuators 1, 20 and 30. The controlling unit 50 is integrated on a single semiconductor chip, and three controlling sub-units 50*a*, 50*b* and 50*c* form the controlling unit 50. The three controlling, sub-units 50*a*, 50*b* and 50*c* respectively control forces in the three directions of an orthogonal set, and the three directions are aligned with the center axes of the plungers 30*k*/30*m*/30*n* of the solenoid-operated actuators 30*a*, 30*b* and 30*c*. If the current position x represents the stroke of the plunger 1*c* of the linear actuator 1, only one axis is aligned with the centerline of the plunger I*c*. Similarly, two axes are aligned with the center lines of the plungers 20*e*/20*f* of the solenoid-operated actuators 20*a*/20*b*.

The three controlling sub-units 50*a*, 50*b* ad 50*c* are similar in circuit arrangement to one another, and description is made on the controlling sub-unit 50*a* only. The controlling sub-unit 50*a* includes three-dimensional data tables 51*a*/51*b*/51*c*/51*d*, parameter correction tables 51*e*/51*f* and multiplication tables 51*g*/51h instead of the coordinate transforming tables 44*a* to 44*c* and the data tables 45*a* to 45*d*. Each of the three-dimensional tables 51*a* to 51*d* consists of a plurality of two-dimensional tables. One of the two-dimensional tables is selected, and a component force data code is specified in the selected two-dimensional table. The other circuit components are similar to those of the controlling sub-unit 40*a*, and are labeled with the references designating the corresponding circuit components of the fourth embodiment.

The sensors 1*d*, 22 and 32 respectively monitors the plungers 1*c*/20*e*/30*a* of the actuators 1/20/30, and supply the analog positional signals Sx in parallel to the multiplexer 41*a* and the group of differentiators 42*a*. The differentiators 42*a* differentiate the current positions x, and determine the current velocities x'. The differentiators 42*a* supply the analog velocity signals Sx' to the multiplexers 41*b* and the croup of differentiators 42*b*. The differentiators 42*b* calculate the current accelerations x", and supply the analog acceleration signals Sx" to the multiplexer 43*c*.

The multiplexer 41*a* assign time slots to the analog positional signals Sx, and serially supplies the analog positional signals Sx to the analog-to-digital converter 43*a*. Similarly, the multiplexer 41*b* assign time slots to the analog velocity signals Sx', and serially supplies the analog velocity signals Sx' to the analog-to-digital converter 43*b*. The multiplexer 41*c* also assign time slots to the analog acceleration signals Sx", and serially supplies the analog acceleration signals Sx" to the analog-to-digital converter 43*c*. The time assigned to a certain analog positional signal Sx is synchronism With the time slots respectively assigned to the analog velocity signal Sx' and the analog acceleration signal Sx" calculated from the certain analog positional signal Sx.

The multiplexer 48*a* also assign time slots to the external analog signals Sext, and the time slots are synchronism with the time slots for the analog positional signals Sx, respectively. The multiplexer 48*a* serially supplies the external analog signals Sext to the analog-to-digital converter 48*b*.

The analog-to-digital converters 43*a*, 43*b*, 43*c* and 48*b* converts the analog positional signal Sx, the analog velocity signal Sx', the analog acceleration signal Sx" and the analog external signal Sext to the digital positional signal DSx, the digital velocity signal DSx', the digital acceleration signal DSx" and the digital external signal DSxext, respectively.

Target force Ft is given by the following equation of motion.

$$Ft=Mx''+\rho x'+\kappa X+f1+f2 \qquad \text{equation 2}$$

The term κX is determined by the three-dimensional tables 51*a*/51*b* and the parameter correction table 51*e*/51*f*, the three-dimensional table 51*c* and the multiplication table 51*g* determine the term ρx', and the term Mx" is given by the three-dimensional table 51*d* and the multiplication table 51*h*.

In detail, the digital positional signals DSx, DSy and DSz are supplied to the three-dimensional table 51*a*, and the current positions x, y and z specify a preliminary component data code kx1. The selector 46 steers the digital positional signal DSx to on e of the three-dimensional tables 51*a* and 51*b* depending upon the sign bit of the digital velocity signal DSx' as similar to the fourth embodiment. The preliminary component data code kx1 is read out from the three-dimensional table 51*a* or 51*b*, and is supplied to the parameter correction table 51*e* or 51*f* Each of the parameter correction tables 51*e* and 51*f* is divided into parameter correction sub-tables, and the digital acceleration signal DSx" selects one of the parameter correction sub-tables. The preliminary component data code kx1 is supplied to the selected parameter correction sub-table, and a first component data code DF1 is read out from the parameter correction sub-table. The first component data code DF1 is representative of a first component force F1 correspondingly to κx. Thus, the preliminary correction data code is modified to the first component data code DF1, and, for this reason, deformation of the moving object due to the acceleration is taken into account.

The first component data code DF1 is transferred to the adder 49*a*. The parameter correction table 51*f* or 51*e* associated with non-selected three-dimensional table 51*b*/51*a* outputs the first component data code DF1 of zero, and the adder 49*a* passes the first component data code DF1 read out from the selected one to the next adder 49*b*. The current positions x, y, z, the current velocity x' and the current acceleration x" are taken into account for the first component force F1 or κx.

In order to determine a second component force F2 corresponding, to ρx', the digital positional signals DSy and DSz are supplied to the three-dimensional table 51*c*, and select one of the two-dimensional tables from the three-dimensional table 51*c*. The two-dimensional tables define the relation between current position x and the parameter ρ, and the digital positional signal DSx specifies a value of parameter ρ from the selected two-dimensional table. The value of parameter ρ is supplied to the multiplication table 51*g*, and selects one of the two-dimensional multiplication sub-tables. The two-dimensional multiplication sub-tables define the relation between the current velocity x' and the second component force F2 or ρx'. When the digital velocity signal DSx' is supplied to the selected two-dimensional multiplication sub-table, a second component data code DF2 representative of the second component force F2 or ρx' is read out from the three-dimensional multiplication table 51*g* to the adder 49*b*, and the second component force F2 is added to the first component force F1. The current position x, y and z are taken into account for the second component force F2 or ρx'. The parameter ρselects one of the two-dimensional multiplication tables and the second force F2 may be weighted by the parameter ρ.

In order to determine a third component force corresponding to Mx", the digital positional signals DSy and DSz are supplied to the three-dimensional table 51*d*, and select one of the two-dimensional tables from the three-dimensional table 51*d*. The two-dimensional tables define the relation between current position x and the parameter M, and the digital positional signal DSx specifies a value of parameter M from the selected two-dimensional table. The value of parameter M is supplied to the multiplication table 51*h*, and selects one of the two-dimensional multiplication sub-tables. The two-dimensional multiplication sub-tables define the relation between the current acceleration x" and the third component force F3 or Mx". When the digital acceleration signal DSx" is supplied to the selected two-dimensional multiplication sub-table, a third component data code DF3 representative of the third component force F3 or Mx" is read out from the three-dimensional multilpli-cation table 51*h* to the adder 49*c*, and the third component force F3 is added to the first and second component forces F1 and F2. The current positions x, y and z are taken into account for the third component force F2 or Mx". The parameter M selects one of the two-dimensional multiplication tables, and the third force F3 may be weighted by the parameter M.

The fourth and fifth component forces F4 and F5 are produced as similar to those of the forth embodiment, and are supplied to the adders 49*d* and 49*e*. The fourth component force F4 is added to the first to third component forces F1 to F3, and the fifth component force F5 is added to the first to fourth component forces F1 to F4. The adder 49*e* outputs the digital target force signal DFt representative of the target force Ft, and is supplied to the modification table 50. The function of the modification table 50, and the regulation of the driving current signal I*x* is analogous to those of the fourth embodiment.

The adder 49*e* sequentially supplies the digital target force signals DFt to the modification table 50. One of the sub-tables is selected from the modification table 50 for each of the digital target force signals DFt, and is assigned to the current position of the actuator to be controlled with the target force Ft. Each of the digital target force signals DFt specifies one of the modified forces Fm in the selected sub-table, and the selected sub-table outputs the digital modified force signal DFm. Thus, the digital modified force signals DFm are successively output from the modification table 50, and are supplied to the demultiplexer 51.

The demultiplexer 51 distributes the digital modified force signals DFm to the pwm drivers 52 associated with the actuators 1/20/30, and the associated current feedback circuits 53 supply the driving currents I*x* to the actuators 1/20/30, and the actuators 1/20/30 exert the modified forces Fm on the associated moving objects, respectively.

No coordinate transformation table is incorporated in the inner force sense controller implementing the fifth embodiment, and the fifth embodiment accelerates the controlling operation rather than the third and fourth embodiments.

Subsequently, description is made on the three-dimensional tables 51*a* to 51*d*, the parameter correction tables 51*e* and 51*f* and the multiplication tables 51*g* and 51*h*. In the following description, only one three-dimensional actuator 30 is controlled by the controlling unit 50.

Assuming now that the three-dimensional actuator 30 is tracing a human face FA, the solenoid-operated linear actuators 30*a*, 30*b* and 30*c* exert the forces Fx, Fy and Fz on the universal joint 30*r*, and tie resulting force Ft is balanced with the reaction from the human face FA. The sensor elements 32*a*, 32*b* and 32*c* monitor the plungers 30*k*/30*m*/30*n*, and produce the analog positional signals Sx, Sy and Sz representative of the strokes of the plungers 30*k*/30*m*/30*n*, respectively. The center lines of the plungers 30*k*/30*m*/30*n* are aligned with the three axes of an orthogonal set, and the current position x, y and z represent coordinates (x, y, z) of the point W. In this situation, the current positions, the current velocities and the current accelerations determine the forces Fx, Fy and Fz. When an analyst measures the forces Fx, Fy and Fz, he determines the relations stored in the three-dimensional tables 51*a*/51*b*, 51*c* and 51*d*, the parameter correction tables 51*e*/51*f* and the multiplication tables 51*g*/51*h* on the basis of the forces Fx, Fy and Fz.

When the universal joint 30*r* is simply pressed against the human face FA, the current velocities and the current accelerations are zero, and the first component force F1 or κx is proportional to the amounts of electric power respectively supplied to the solenoid-operated linear actuators 30*a*/30*b*/30*c* or the forces Fx, Fy and Fz The analyst measures the amounts of electric power over the human face FA, and the relations between the current positions x/y/z and the forces Fx/Fy/Fz are stored in the three-dimensional tables 51*a* to 51*d*.

The three-dimensional data table 51*c* and the multiplication table 51*g* are determined through the measurement of the amounts of electric power by changing the velocity of the universal point 30*r*, arid the three-dimensional data table 51*d* and the multiplication table 51*h* are also determined through the measurement of the amounts of electric power under different accelerations. In the actual measurement, the analyst keeps the directions of the forces Fy/Fz constants and measures the amounts of electric power by changing the force Fx. Subsequently, the amounts of electric power are measured for each of the forces Fy and Fz in a similar manner to the force Fx. When the universal point 30*r* is pressed against a fragile article, a limiter is provided in the controlling unit so that the resulting force Ft does not exceed a dangerous level.

Using the three-dimensional data tables 51*a* to 51*d*, the parameter correction tables 51*e*/51*f* and the multiplication tables 51*g*/51*h*, the three-dimensional actuator 30 gives an inner force sense to an operator as if he traces the human face FA. He feels the manipulator 31 to be resilient.

As will be understood from the foregoing description, the inner force sense controller implementing the fifth embodiment determines the target forces without a coordinate transformation, and the processing speed is enhanced. The inner force sense controller is applicable to a tool taking the resiliency into consideration or an apparatus to determine the three-dimensional profile or to decide a three-dimensional boundary.

Application

Figure 16:
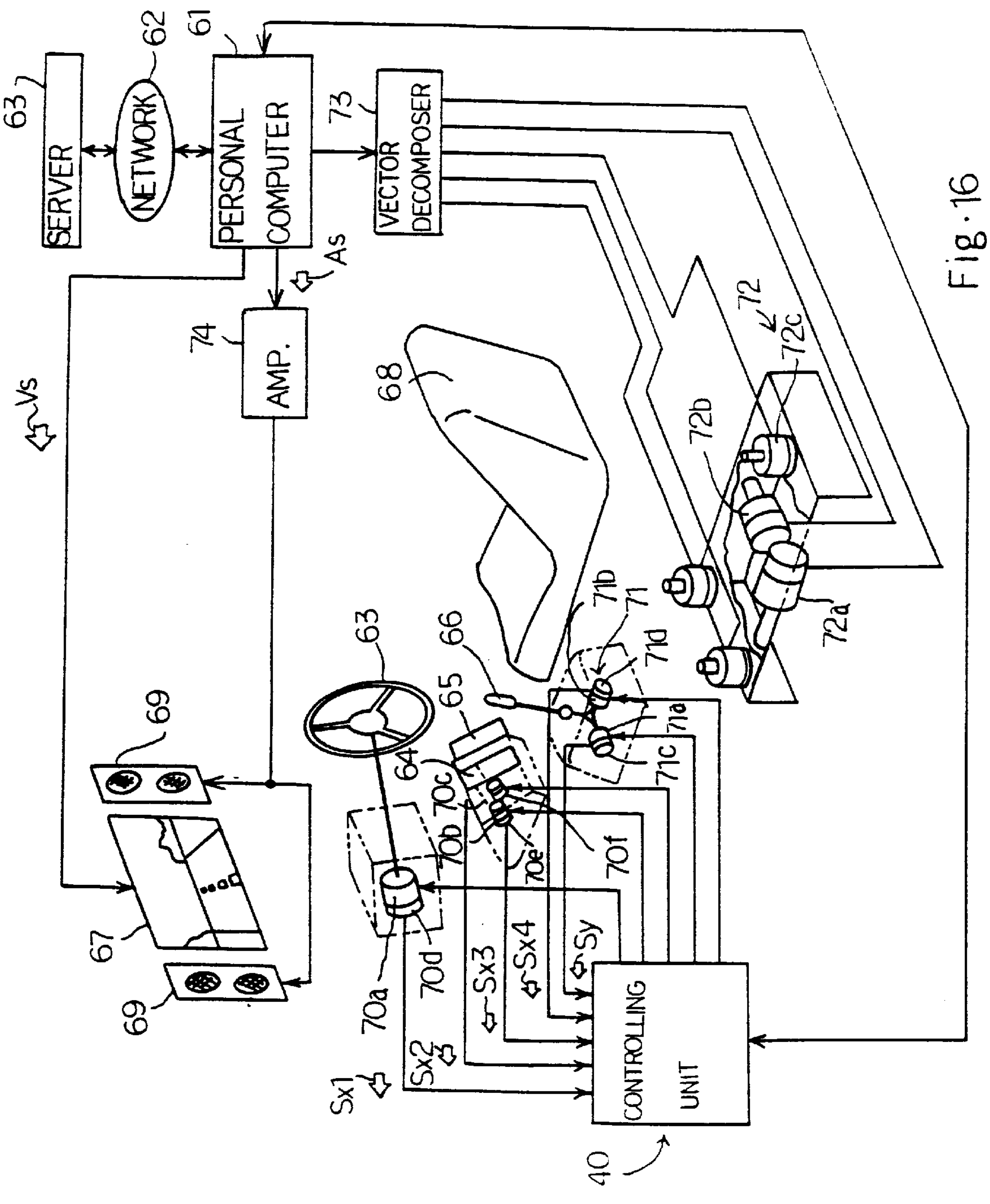
FIG. 16 is a schematic view showing a driving simulator equipped with the inner force sense controller.
Figure 17:
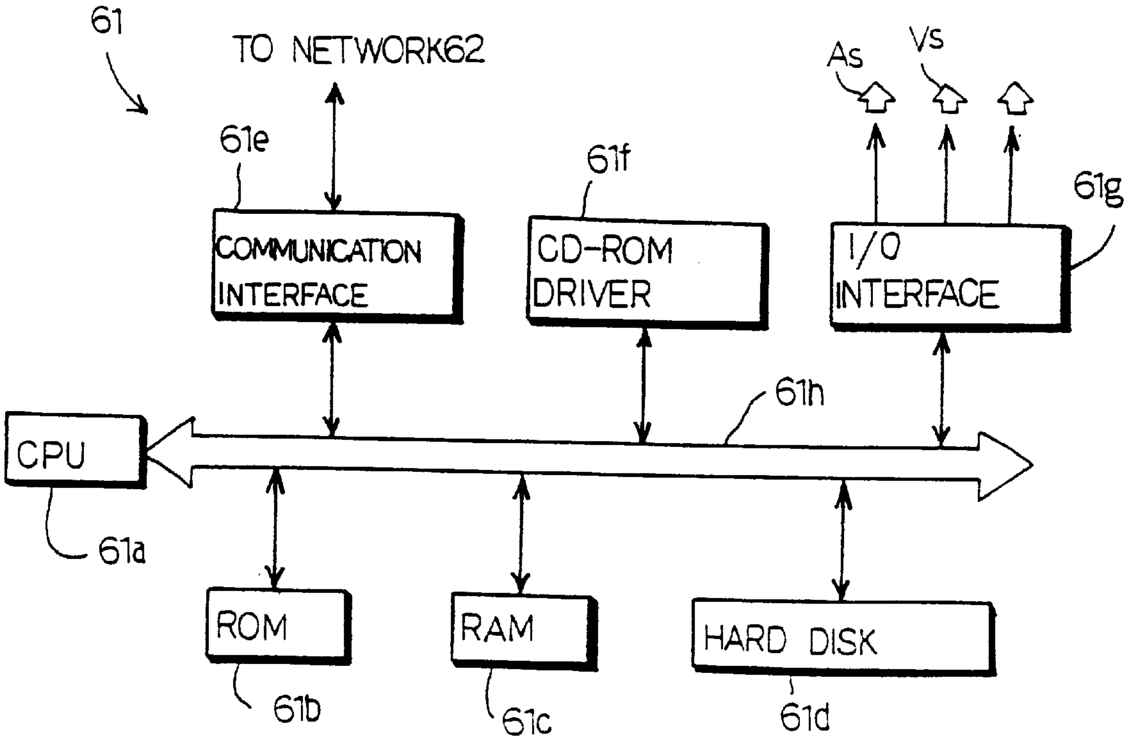
FIG. 17 is a block diagram showing the arrangement of circuit components incorporated in a personal computer forming a part of the driving simulator.

In the first to fifth embodiment, the program sequence may be stored in a memory associated with the central processing unit, supplied through a portable memory such as a CD-ROM disk or through an information communicating line. FIG. 16 illustrates a driving simulator equipped with the inner force sense controller implementing the fourth embodiment The driving simulator comprises the inner force sense controller and a personal computer 61 connected to an information communicating network 62, and a server 63 supplies a controlling program through the information communicating network 62 to the personal computer 61. The controlling program makes the personal computer 61 control the inner force sense controller and the other equipment described hereinbelow, and contains pieces of touch data information or the parameters of the motion of equation. The controlling unit 40 is integrated on a semiconductor chip, and is connected to the personal computer 61.

The driving simulator further comprises a steering, wheel 63, a clutch pedal 64, an accel pedal 65, a braking pedal (not shown) and a shift lever 66 and so forth. When a driver manipulates these components 63 to 66, the inner force sense controller 40 gives variable reaction forces to these components. If the pieces of touch data information is modified, the drivel feels the components 63 to 66 different.

The driving simulator further comprises an image display 67 placed in front of a driver's seat 68 and a speaker system 69. The personal computer 61 produces a moving picture on the screen of the intake display 67, and makes the speaker system 69 to sound. A driver sittings on the driver's seat experiences a virtual environment through the image display 67 and the speaker system 69.

FIG. 16 illustrates the arrangement of the personal computer 61. A central processing unit 61*a*, a read only memory device 61*b*, a random access memory device 61*c*, a hard disk unit 61*d*, a communication interface 61*e*, a CD-ROM driver 61*f* and an input/output interface 61*g* are connected to a bus system 61*h*, and the central processing unit 61*a* communicates with the other components 61*b* to 61*g* through the bus system 61*h*. When the server 63 supplies the controlling program through the information communicating network 62, the personal computer 60 receives the controlling program at the communication interface 61*e*, and transfers the controlling program through the bus system 61*h* to the hard disk unit 61*d*. The controlling program is written into the hard disk unit 61*d*. If the controlling program is stored in a CD-ROM disk (not shown), the CD-ROM disk is inserted into the CD-ROM driver 61*f*, and the controlling program is transferred to the hard disk unit 61*d* so that the hard disk unit 61*d* stores the controlling program. The central processing unit 61*a* carries out the data transfer and the writing operation in accordance with the program codes stored in the read only memory device 61*d*, and the random access memory device provides a working area during the execution of the controlling program.

Linear actuators 70*a*, 70*b* and 70*c* are provided for the steering wheel 63, the clutch pedal 64, the braking pedal and the accel pedal 65, respectively, and a two-dimensional activator 71 is held in contact with the shift lever 66. The linear actuators 70*a*, 70*b* and 70*c* are accompanied with sensors 70*d*, 70*e* and 70*f*, respectively, and the sensors 70*d* to 70*f* respectively produce analog positional signals Sx1, Sx2 and Sx3. The analog positional signals 70*d* to 70*f* are representative of current positions of the movable elements of the linear actuators 70*a* to 70*c* and, accordingly, the current position of the steering wheel 63, the current position of the clutch pedal 64, the current position of the braking pedal and the current position of the accel pedal, respectively, and are supplied to the controlling unit 40. Two linear actuators 71*a*/71*b* form in combination the two-dimensional actuators 71, and sensors 71*c*/7 1*d* monitor the linear actuators 71*a*/71*b* so as to produce analog positional signals Sx4 and Sy representative of current positions of the movable elements of the linear actuators 71*a*/71*b*. The analog positional signals Sx4 and Sy are also supplied to the controlling unit 40.

A three-dimensional actuator 72 is provided for the driver's seat 68, and linear actuators 72*a*, 72*b* and 72*c* form in combination the three-dimensional actuator 72 in a similar manner to the three-dimensional actuator 30. The three-dimensional actuator 72 three-dimensionally moves the driver's seat, and changes driver's attitude. In detail, the personal computer 61 is connected to a vector decomposer 73, and supplies a driving signal representative of a resulting force F to the vector decomposer 73. The vector decomposer 73 produces driving current signals DR1, DR2 and DR3 from the driving signal, and supplies the driving current signals DR1/DR2/DR3 to the linear activators 72*a*, 72*b* and 72*c*. The driving current signals DR1, DR2 and DR3 cause the linear actuators 72*a*/72*b*/72*c* to exert component forces to the driver's seat, and the driver experiences acceleration and deceleration as if he actually drives a vehicle. For example, when the driver presses down the accel pedal, the three-dimensional actuator 72 exerts the force on the seat, and the driver experiences the acceleration. Moreover, when the driver brings the vehicle into collision with an obstacle, the three-dimensional actuator 72 violently shakes the driver's seat, and makes the driver experience the shock.

The controlling unit 40 is connected to the personal computer 61, and informs the personal computer 61 of the current positions of the steering wheel/clutch pedal/braking pedal/accel pedal/shift lever 63/64/65/66. The personal computer 61 analyzes the current positions, and controls the moving picture and the sounds. While the central processing unit is sequentially executing the controlling program, the central processing unit 61 a produces a video signal Vs and an audio signal As on the basis of the current positions, and instructs the input/output interface 61*g* to transfer the video signal Vs and the audio signal As to the image display 67 and an amplifier 74. The image display produces a moving picture on the screen, and the amplifier 74 makes the speaker system 69 to produce sounds.

The personal computer 62 supplies the parameters of the equation of motion and the touch data codes to the controlling unit 40, and the parameters and the touch data codes form the data tables 45*a* to 45*d* and the data table 48*c* in the controlling unit 40. Thus, the contents of the data tables 45*a* to 45*d* and 48 are supplied from the outside, and, are accordingly, modifiable by changing the controlling program. In this instance, the personal computer 61 changes the contents of the data tables depending upon the virtual environment. For example, the personal computer makes the steering wheel heavy so as to make the driver experience a graveled road, and the steering wheel light so as to make the driver experience a rainy road.

As will be appreciated from the foregoing description, the inner force sense controller according to the present invention courses a person to experience a virtual environment, and is suitable floor an amusement apparatus such as the driving simulator.

Figure 18:
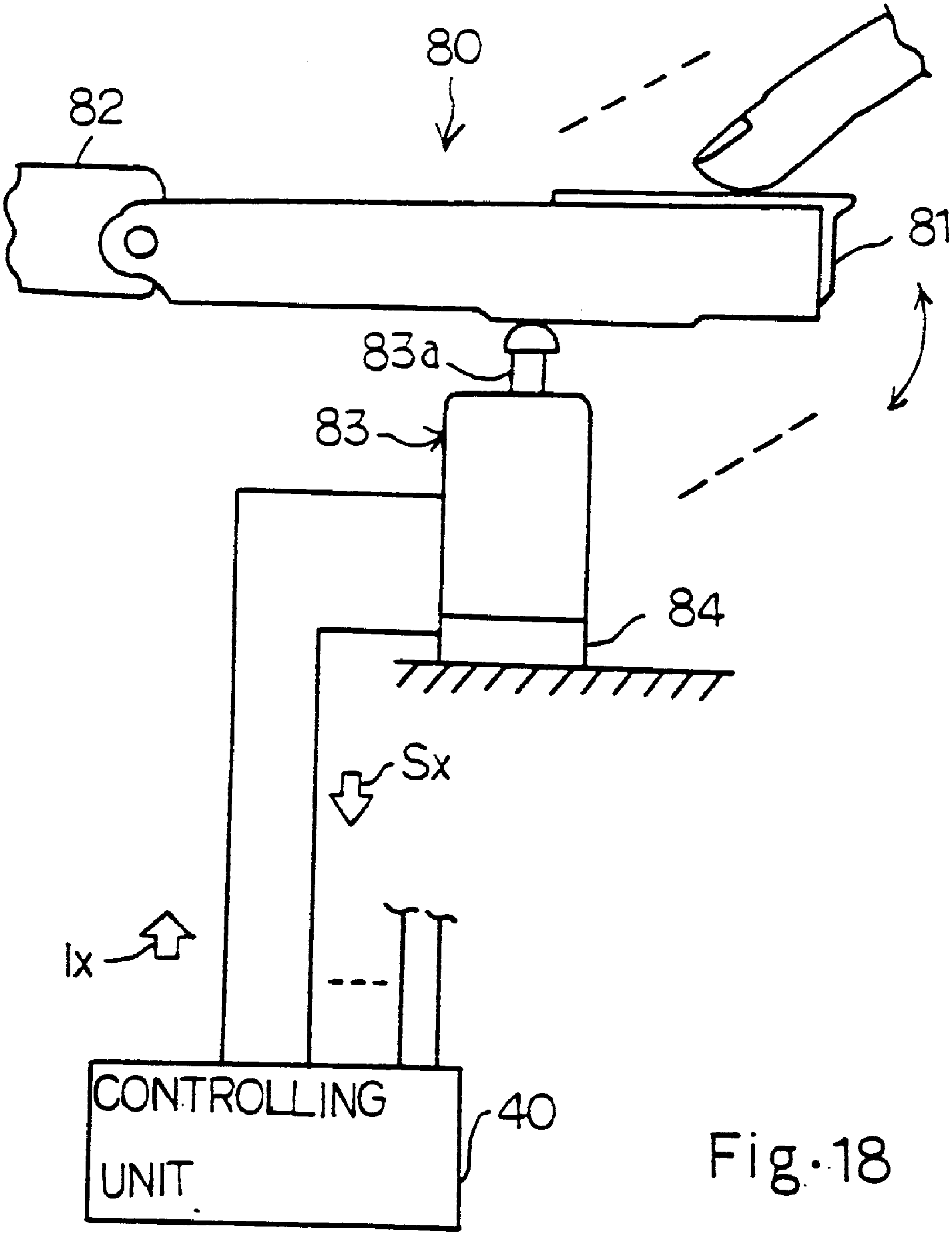
FIG. 18 is a side view showing a keyboard associated with the inner force sense controller according to the present invention.

FIG. 18 illustrates a keyboard 80 associated with the inner force sense controller according to the present invention. The keyboard may form a part of an electronic keyboard musical instrument. A plurality of black/white keys 81 are turnably supported by a stationary supporting member 82, and are held in contact with plungers 83*a* of solenoid-operated linear actuators 83. Linear sensors 84 are attached to the solenoid-operated linear actuator 83, and produce an analog positional signal Sx representative of a current plunger position and, accordingly, a current key position. The analog positional signal Sx is supplied to the controlling unit 40, and determines the magnitude of reaction force F. The controlling unit 40 supplies a driving current signal I*x* equivalent to the reaction force F, and the solenoid-operated linear actuator 83 projects the plunger 83*a* against the key motion. The player feels the reaction to be similar to the key touch of the black/white key of an acoustic piano. Thus, the inner force sense controller according to the present invention controls the linear actuators 83, only.

Figure 19:
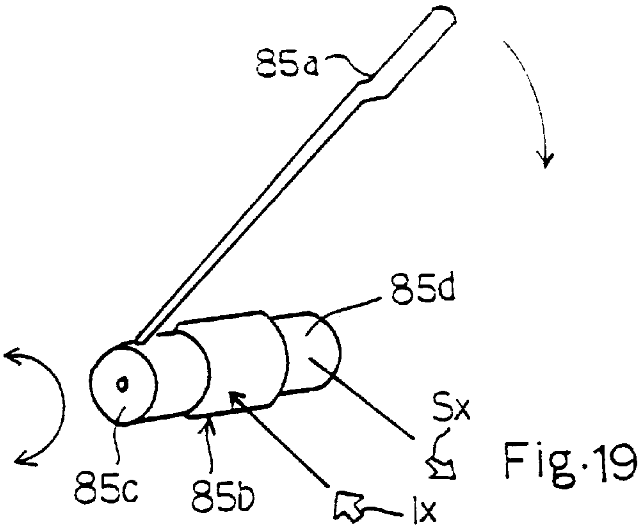
FIG. 19 is a perspective view showing a lever associated with the inner force sense controller according to the present invention.
Figure 20:
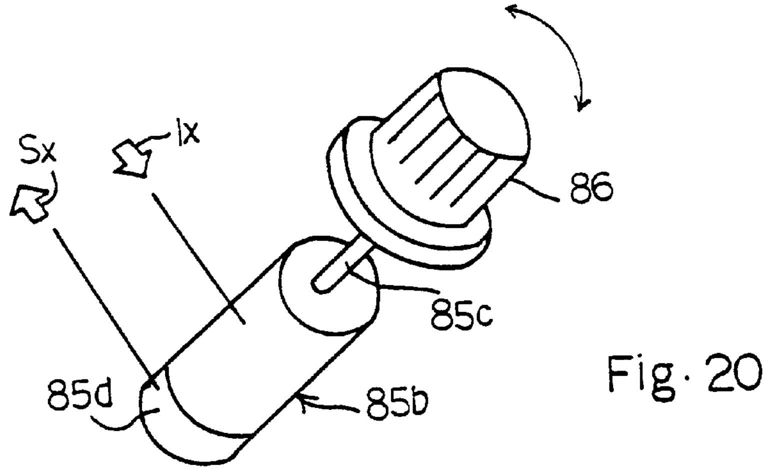
FIG. 20 is a perspective view showings a dial associated with the inner force sense controller according to the present invention.
Figure 21:
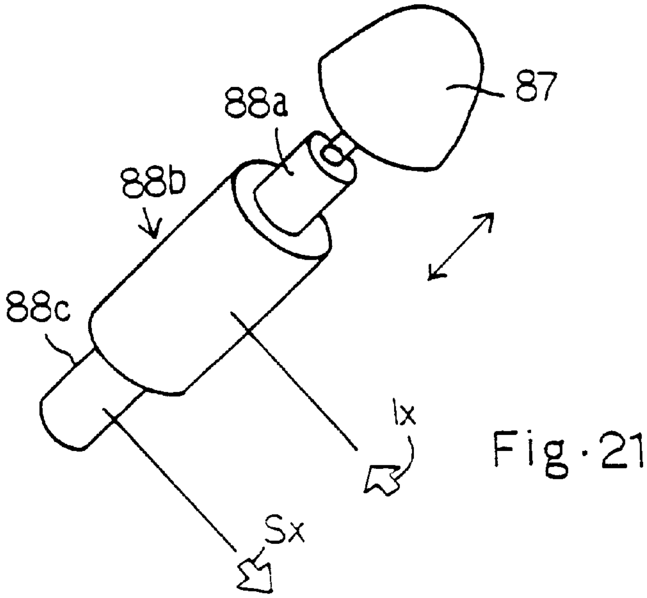
FIG. 21 is a perspective view showing a push-down button switch associated with the inner force sense controller according to the present invention.

FIGS. 19, 20 and 21 illustrate other applications of the inner force sense controller. A lever 85*a* is fixed to a rotary shaft 85*b* of a solenoid-operated rotary actuator 85*c*, and a rotary sensor 85*d* monitors the rotary shaft 85*b* The rotary sensor 85*d* produces an analog positional signal Sx representative of a current angular position of the rotary shaft 85*c*, and supplies the analog positional signal Sx to the controlling unit (not shown). The controlling unit determines a target reaction force, and supplies a driving current signal I*x* representative of the target reaction moment to the solenoid-operated rotary actuator 85*b*. The solenoid-operated rotary actuator 85*b* exerts the target reaction moment on the lever 85*a*, and an operator feels the reaction moment to be an inner force sense. A dial 86 may be attached to the rotary shaft 85*c* as shown in FIG. 20. A push-down button 87 may be attached to the plunger 88*b* of a solenoid-operated linear actuator 88*b*, and a linear sensor 88*c* may monitors the plunger 88*c* as shown in FIG. 21.

Figure 22:
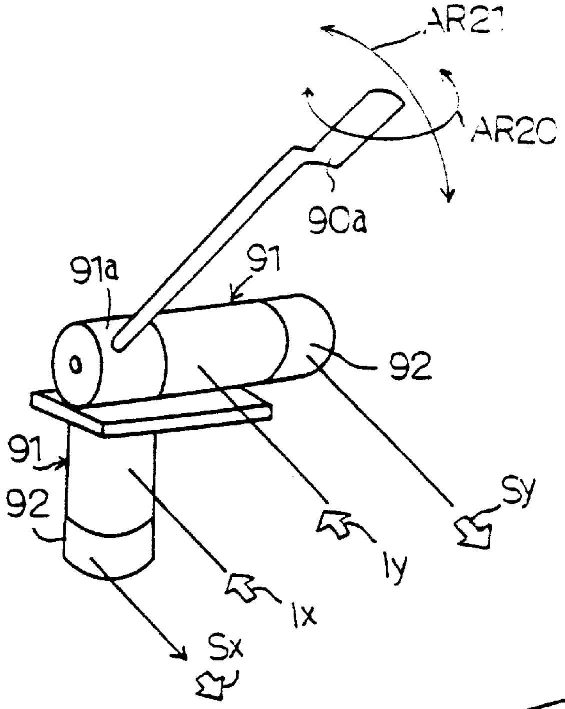
FIG. 22 is a perspective view showily a two-dimensional manipulator in-corporated in a musical instrument and controlled by the inner force sense controller according to the present invention.

The inner force sense controller according to the present invention may be provided for two-dimensional actuators only. FIG. 22 illustrates a two-dimensional manipulator available for a musical instrument. A lever 90*a* is fixed to rotary shafts 91*a* of two solenoid-operated rotary actuators 91 arranged in perpendicular to each other, and rotary sensors 92 monitor the rotary shafts 91*a*, respectively The rotary sensors 91*a* produce analog angular positional signals Sx and Sy representative of current angular positions of the rotary shafts 91*a*, and supply the analog angular positional signals Sx and Sy to the controlling unit (not shown). The controlling unit determines target reaction moments, and supply driving current signals I*x* and I*y* representative of the target reaction moment to the solenoid-operated rotary actuators 91. The solenoid-operated rotary actuators 91 exert the target reaction moments on the lever 90*a*, and an operator feels the reaction moments to be an inner force sense.

A player specifies a note by rotating the lever 90*a* in the direction of allow AR20 and the intensity of sound by rotating the lever 90*a* in the direction of allow AR21. The controlling, unit intermittently increases the reaction moment, and lets the player know appropriate angular positions. The angular position in the direction of arrow AR21 may specify a timbre of sounds.

Figure 23:
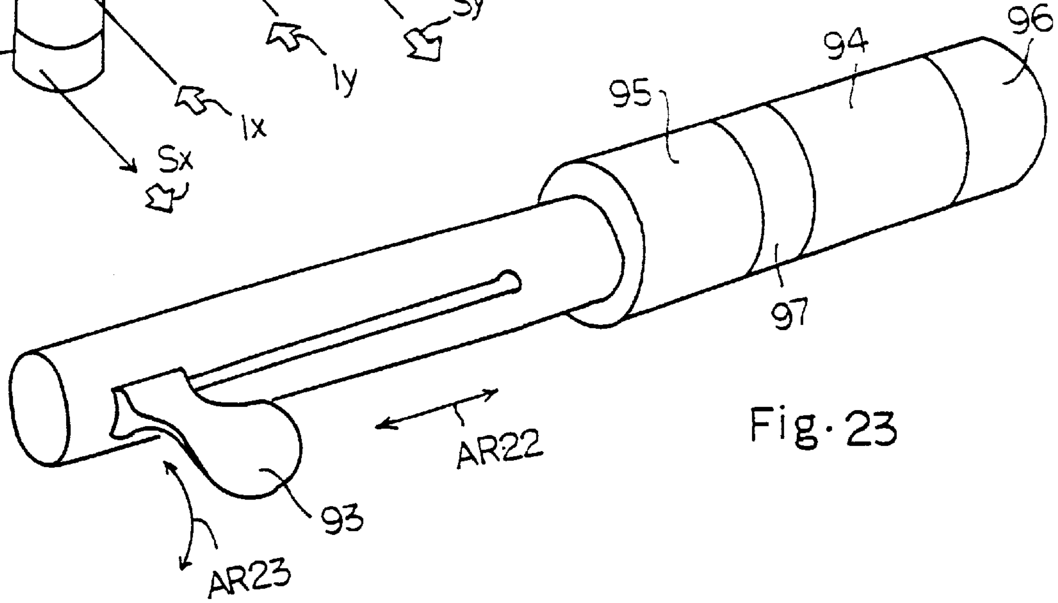
FIG. 23 is a perspective view showing a trombone type musical instrument equipped with the two-dimensional manipulator.
Figure 24:
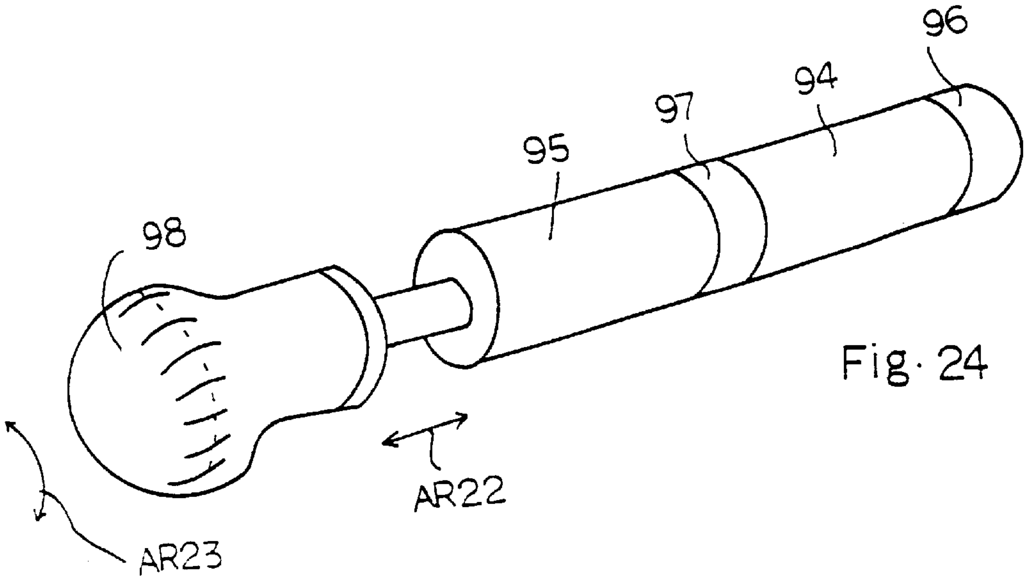
FIG. 24 is a perspective view showing another two-dimensional manipulator incorporated in a musical instrument.

FIG. 23 illustrates another manipulator incorporated in a trombone type musical instrument. A lever 93 is slidable in the direction of allow AR22 and turnable in the direction of allow AR23. A solenoid-operated linear actuator 94 and a solenoid-operated rotary actuator 95 are connected to the lever 93, and a linear sensor 96 and a rotary sensor 97 monitor the movable element of the solenoid-operated linear actuator 94 and the movable element of the solenoid-operated rotary actuator 95, respectively. A player moves the lever 93 in the direction of allow AR22 for specifying a note and in the direction of allow AR23 for regulating the intensity of sounds. The lever 93 may be replaced with a grip 98 as shown in FIG. 24.

Figure 25:
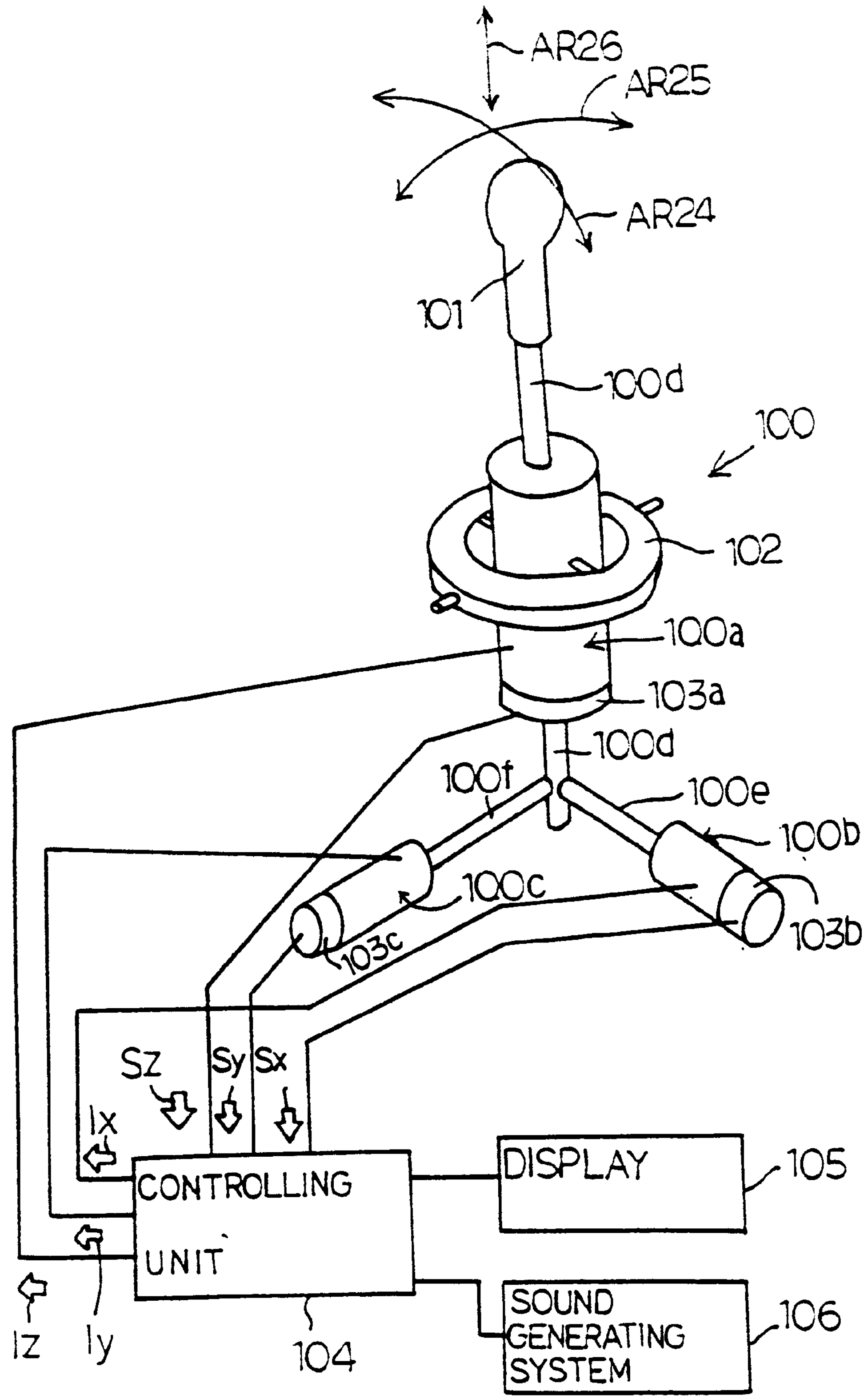
FIG. 25 is a perspective view showing another musical instrument equipped with a three-dimensional manipulator according to the present invention.

The inner force sense controller may be incorporated in a musical instrument performed by manipulating a three-dimensional actuator 100 is shown in FIG. 25. The three-dimensional actuator 100 has three solenoid-operated linear actuators 100*a*, 100*b* and 100*c* arranged in an orthogonal set, and a knob 101 is connected to a plunger 100*d* of the solenoid-operated linear actuator 100*a*, and the solenoid-operated lineal actuator 100*a* is turnably supported by a retainer ring 102. Plungers 100*e*/100*f* of the solenoid-operated linear actuators 100*b*/100*c* are connected to the plunger 100*d* of the solenoid-operated linear actuator 100*a*. A player moves the knob 101 in the directions of arrows AR24, AR25 and AR26, and the motion of knob 101 is transferred to the plungers 100*d*/100*e*/100*f*. Sensors 103*a*, 103*b* and 103*c* monitor the motions of the plungers 100*d*/100*c*/100*f*, and supply analog positional signals Sz/Sx/Sy to a controlling unit 104. The controller 104 supplies driving currents Ix, Iy and Iz to the solenoid-operated linear actuators 100*b*, 100*c* and 100*a*, and intermittently applies resistance against the motion of the knob 101 Thus, the player feels the knob 101 click.

The controller 104 not only applies the click but also determines a note, an intensity and a timbre for an electronic sound depending upon the current position in the direction of arrow AR25, the current position in the direction of arrow AR24 and the current position in the direction of arrow AR26. The controlling unit 104 displays music information only a display 105, and instructs the sound to be produced to a sound generating system 106.

Using the three-dimensional actuator 100, a handicapped person such as the blind can play a tune by manipulating the knob 101. Thus, the inner force sense controller not only gives a click to the player bit also specifies the note, the intensity and the timbre.

Modifications

Although the particular embodiments of the present invention have been shown and described, it will be obvious to those skilled in the art that various changes and modifications may be made without departing from the spirit and scope of the present invention.

For example, the inner force sense controller may determine the contents of the three-dimensional data tables 51*a* to 51*d*, the contents of the parameter correction tables 51*e*/51*f* and the contents of the multiplication tables 51*g*/51*h* by itself so as to write the relations into a suitable memory.

The inner force sense controller may be used for a flight simulator for an airplane. In the simulator, the personal computer 61 gives the current positions, the current velocities and the current accelerations for controlling the actuators 70*a*, 70*b* and 70*c*. The current positions, the current velocities and the current accelerations may be supplied through an information communicating network to the controlling unit 40. For example, two inner force sense controllers may be placed at different locations. In this instance, the analog positional signals may be supplied from one of the controllers to the other so that another person experiences the inner force sense on the different inner force sense controller.

Figure 26:
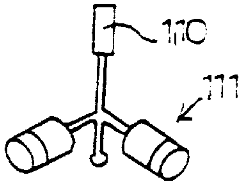
FIG. 26 is a perspective view showing a joy stick associated with the inner force sense controller according to the present invention.
Figure 27:
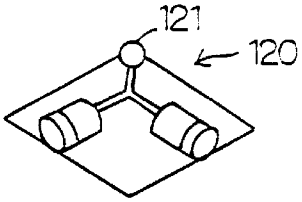
FIG. 27 is a perspective view showing a shape recognition system associated with the inner force sense controller according to the present invention.

The inner sense controller may be used in a joy stick 110 connected to a two-dimensional actuator 111 as shown in FIG. 26.

The inner sense controller may be used in a shape recognition system 120 In this instance, while a manipulator 121 is moving along the profile of an object (not shown), the inner force sense controller minimizes the reaction. However, if the manipulator is spaced from the profile, the inner force sense controller increases the reaction. Therefore, when an operator moves the manipulator 121 around the profile, the manipulator is forced to trace the profile, and the operator easily determines the shape of the object.

Figure 28:
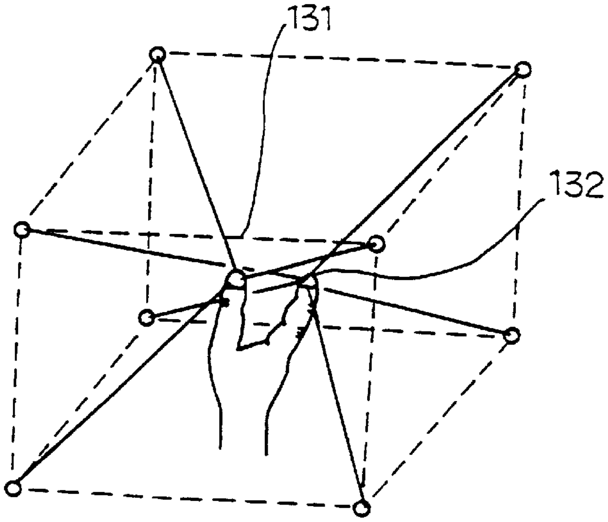
FIG. 28 is a perspective view showing a three-dimensional shape recognition system equipped with the inner force sense controller according to the present invention.

The inner force sense controller may be used in a three-dimensional shape recognition system shown in FIG. 28. Caps 131 and 132 are put only two fingers of an operator, and eight strings are stretched between the two caps 131/132 and eight linear actuators. If no virtual object is in contact with the caps 131/132, the eight linear actuators minimize the tension exerted on the strings. However, when the virtual object is brought into contact with the caps 131/132, the linear actuators selectively increase the tension, and the operator recognizes the configuration of the virtual object.

Figure 29:
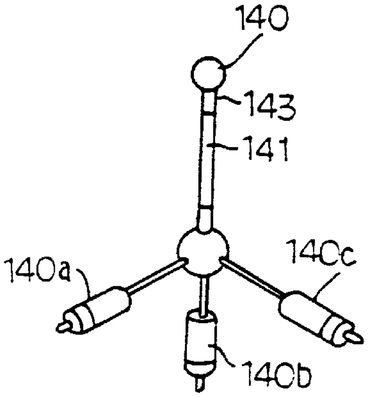
FIG. 29 is a perspective view showing a remote cooperation system equipped with the inner force sense controller according to the present invention.

The inner force sense controller may be used in a remote cooperation system shown in FIG. 29. A controlling lever 140 is associated with linear actuators 140*a*/140*b*/140*c*, and various tactile sense sheets 141 are attached to a connecting rod 143.

The linear actuators may be not arranged in an orthogonal set. However, if the linear actuators are arranged in an orthogonal set, the target forces are easily calculated.

The digital positional signal, the digital velocity signal and the digital acceleration signal may be selectively combined for forming address signals to the data tables 45*a* to 45*d*. Similarly, the digital positional signals DSX/DSY or DSX/DSY/DSZ, the digital velocity signals DSX'/DSY' or DSX'/DSY'/DSZ' and the digital acceleration signals DSX"/DSY" or DSX"/DSY"/DSZ" may be used for selecting the digital component data codes.

The data table 48*c* may be responsive to the digital positional signal, the digital velocity signal and the digital acceleration signal for reading out one of the sets of parameters M, ρ, κ and f. In this instance, the fifth component force DF5 is calculated by using the set of parameters.

As to the fifth embodiment, the current velocities y' and z' may be used in the calculation of term ρx'. The current accelerations y" and z" may be used in the calculation of Mx".

An interpolation may be carried Out for obtaining an appropriate group of parameters.

The data tables in the third or fourth embodiment may be produced through the analysis described in connection with the fifth embodiment.

The current velocity and the current acceleration may be directly determined by using suitable sensors. The current velocity and the current position may be calculated from a current acceleration.

The control sequence of the inner force sense controller results in a method of giving an inner force sense. The contents of the data tables may be supplied from a data storing medium or through an information communicating network. The contents of the data tables may be magnetically, electrically or optically read out from a magnetic disk, an optical disk, a CD-ROM or a semiconductor memory device.

What is claimed is:

1. An inner force sense controller for giving a force to a manipulator comprising:

an actuator connected to said manipulator, and driving said manipulator in more than one direction;

a detector for detecting said current position of said manipulator;

a controller connected to said actuator and said detector, and producing a controlling signal representative of said force to be produced by said actuator;

a driver responsive to said controlling signal for energizing said actuator, thereby exerting said force to said manipulator; and a determining means for determining the direction of a motion of said manipulator, and causing said controller to take said direction of said motion of said manipulator into account for determining the magnitude of said force.

2. The inner force sense controller as set forth in claim 1, in which said force is exerted on said manipulator in the opposite direction to said direction of said motion.

3. The inner force sense controller as set forth in claim 1, in which said force is exerted on said manipulator in the same direction as said motion thereof.

4. The inner force sense controller as set forth in claim 1, in which said manipulator is a key incorporated in a keyboard musical instrument so that said force gives a player an inner force sense similar to that of said key differently varied between a forward motion and a backward motion.

5. The inner force sense controller as set forth in claim 4, in which said keyboard musical instrument is an acoustic piano.

6. An inner force sense controller for giving a force to a manipulator comprising:

an actuator connected to said manipulator, and driving said manipulator in more than one direction;

a detector for detecting said current position of said manipulator;

a controller connected to said actuator and said detector, and producing a controlling signal representative of said force to be produced by said actuator; and a driver responsive to said controlling signal for energizing said actuator, thereby exerting said force to said manipulator, wherein said controller determines a current velocity and a current acceleration on the basis of said current position, and decides the magnitude of said force on the basis of a combination of elements selected from the group consisting of said current position, said current velocity and said current acceleration.

7. The inner force sense controller as set forth in claim 6, in which said controller includes data tables storing parameters of an equation of motion, and said parameters are selectively read out from said data tables on the basis of said combination for determining said force.

8. The inner force sense controller as set forth in claim 6, in which said manipulator is a key incorporated in a keyboard musical instrument.

9. The inner force sense controller as set forth in claim 8, in which said keyboard musical instrument is an acoustic piano.

10. A method for controlling an inner force sense comprising the steps of:

a) producing a piece of status information representative of a current status of a manipulator movable in more than one direction;

b) determining the magnitude of a force on the basis of said current status and a direction of a motion of said manipulator; and c) exerting said force on said manipulator for imparting said inner force sense.

11. The method as set forth in claim 10, in which said piece of status information causes component forces corresponding, to terms of an equation of motion to be read out from data tables for determining said magnitude of said force.

12. The method as set forth in claim 8, in which contents of said data tables are supplied from an information storage medium before said step b).

13. The method as set forth in claim 8, in which contents of said data tables are supplied through an information communicating network.

14. The method as set forth in claim 10, in which said manipulator is a key incorporated in a keyboard musical instrument so that said force gives a player an inner force sense similar to that of said key differently varied between a forward motion and a backward motion.

15. The method as set forth in claim 14, in which said keyboard musical instrument is an acoustic piano.

16. An information storage medium for storing a controlling program, said controlling program comprising the steps of:

a) producing a piece of status information representative of a current status of a manipulator movable in more than one direction;

b) determining the magnitude of a force on the basis of said current status and a direction of a motion of said manipulator; and c) exerting said force on said manipulator for imparting said inner force sense.

17. The information storage medium as set forth in claim 16, in which said manipulator is a key incorporated in a keyboard musical instrument so that said force gives a player an inner force sense similar to that of said key differently varied between a forward motion and a backward motion.

18. The method as set forth in claim 17, in which said keyboard musical instrument is an acoustic piano.

19. An inner force sense controller for exerting a force on a manipulator movable in more than one direction by using an actuator, comprising a means for receiving a program through an information communicating network, said program including the steps of:

a) producing a piece of status information representative of a current status of a manipulator movable in more than one direction;

b) determining the magnitude of a force on the basis of said current status and a direction of a motion of said manipulator; and c) exerting said force on said manipulator for imparting said inner force sense.

20. The inner force sense controller as set forth in claim 19, in which said manipulator is a key incorporated in a keyboard musical instrument so that said force gives a player an inner force sense similar to that of said key differently varied between a forward motion and a backward motion.

21. The method as set forth in claim 20, in which said keyboard musical instrument is an acoustic piano.

* * * * *